US012794317B2

(12) United States Patent
Ogawa et al.

(10) Patent No.: US 12,794,317 B2
(45) Date of Patent: Nov. 10, 2026

(54) ROTOR, ROTATING ELECTRICAL MACHINE, AND DRIVE DEVICE

(71) Applicant: NIDEC CORPORATION, Kyoto (JP)

(72) Inventors: Kosuke Ogawa, Kyoto (JP); Shuji Iwasaki, Kyoto (JP); Masami Sugino, Kyoto (JP); Yuki Yanagita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 260 days.

(21) Appl. No.: 18/621,098

(22) Filed: Mar. 29, 2024

(65) Prior Publication Data

US 2024/0333098 A1 Oct. 3, 2024

(30) Foreign Application Priority Data

Mar. 31, 2023 (JP) ................................ 2023-058388
Sep. 28, 2023 (JP) ................................ 2023-168466

(51) Int. Cl.
*H02K 9/06* (2006.01)
*H02K 1/276* (2022.01)

(52) U.S. Cl.
CPC ............... *H02K 9/06* (2013.01); *H02K 1/276* (2013.01)

(58) Field of Classification Search
CPC ................................ H02K 9/16; H02K 1/276
USPC ..................................................... 310/62, 63
See application file for complete search history.

(56) References Cited

U.S. PATENT DOCUMENTS

2022/0271614 A1* 8/2022 Makino .................. H02K 11/40

FOREIGN PATENT DOCUMENTS

JP 2011-211862 A 10/2011
WO 2023127351 A1 7/2023
WO WO-2023127349 A1 * 7/2023 ............... H02K 9/06

* cited by examiner

*Primary Examiner* — Jose A Gonzalez Quinones
(74) *Attorney, Agent, or Firm* — HAUPTMAN HAM, LLP

(57) ABSTRACT

A rotor includes: a rotor core having first and second vent holes penetrating in an axial direction; and a fan disposed to face at least one end surface on an axial side of the rotor core, and having an outflow path connected to the first vent hole and an inflow path connected to the second vent hole. The fan includes a first surface facing the end surface, an outer surface positioned radially outside the first surface, and a first recess portion in the first surface and axially overlapping the first vent hole. The first recess portion includes a first opening portion opening to the outer surface. At least a part of the outflow path is surrounded by the end surface and the first recess portion. A cross-sectional area of the outflow path in the first opening portion is smaller than a minimum cross-sectional area of the inflow path.

20 Claims, 12 Drawing Sheets

ROTOR, ROTATING ELECTRICAL MACHINE, AND DRIVE DEVICE

CROSS-REFERENCE TO RELATED APPLICATIONS

The present invention claims priority under 35 U.S.C. § 119 to Japanese Patent Application No. 2023-058388 filed on Mar. 31, 2023 and Japanese Patent Application No. 2023-168466 filed on Sep. 28, 2023, the entire contents of which are incorporated herein by reference.

FIELD OF THE INVENTION

The present invention relates to a rotor, a rotating electrical machine, and a drive device.

BACKGROUND

With increasing interest in electric vehicles in recent years, various methods for cooling a rotating electrical machine have been developed. For example, there is a known rotating electrical machine that cools a rotor and a coil by blowing air from the inside of a fan rotor disposed at an axial end portion of the rotor toward the coil.

Depending on the shape of the fan, the flow velocity of the air blown out toward the coil becomes insufficient, and there is a possibility that the coil cannot be efficiently cooled.

SUMMARY

One aspect of an exemplary rotor of the present invention is a rotor rotatable about a center axis, the rotor including: a rotor core provided with a first vent hole and a second vent hole penetrating in an axial direction; and a fan disposed to face at least one end surface on an axial one side or an axial other side of the rotor core, and provided with an outflow path connected to the first vent hole and an inflow path connected to the second vent hole. The fan includes a first surface facing the end surface, an outer surface positioned radially outside the first surface, and a first recess portion provided on the first surface and axially overlapping the first vent hole. The first recess portion includes a first opening portion opening to the outer surface. At least a part of the outflow path is provided in a space surrounded by the end surface and the first recess portion. A flow path cross-sectional area of the outflow path in the first opening portion is smaller than a minimum flow path cross-sectional area of the inflow path.

One aspect of an exemplary rotating electrical machine of the present invention includes the above-described rotor and a stator positioned radially outside the rotor.

One aspect of an exemplary drive device of the present invention includes the above-described rotating electrical machine and a power transmission unit that transmits power of the rotating electrical machine.

The above and other elements, features, steps, characteristics and advantages of the present disclosure will become more apparent from the following detailed description of the preferred embodiments with reference to the attached drawings.

DETAILED DESCRIPTION

Hereinafter, an embodiment applied with the present invention will be described in detail with reference to the drawings. Description below will be made with a direction of gravity being specified based on a positional relationship in a case where a drive device 1 is mounted in a vehicle positioned on a horizontal road surface. In the description below, unless otherwise specified, a direction (Y axis direction) parallel to a center axis J of a rotating electrical machine 2 is simply called an "axial", a radial direction about the center axis J is simply called a "radial", and a circumferential direction about the center axis J, that is, around the center axis J is simply called a "circumferential". However, the "parallel direction" described above also includes a substantially parallel direction. Although the drive device 1 of the present embodiment will be described as being disposed such that the center axis J is parallel to the horizontal direction, the posture of the center axis J is not necessarily limited.

In the present description, "face the axial direction" means facing a direction parallel to the axial direction or a direction having an axial component.

Figure 1:
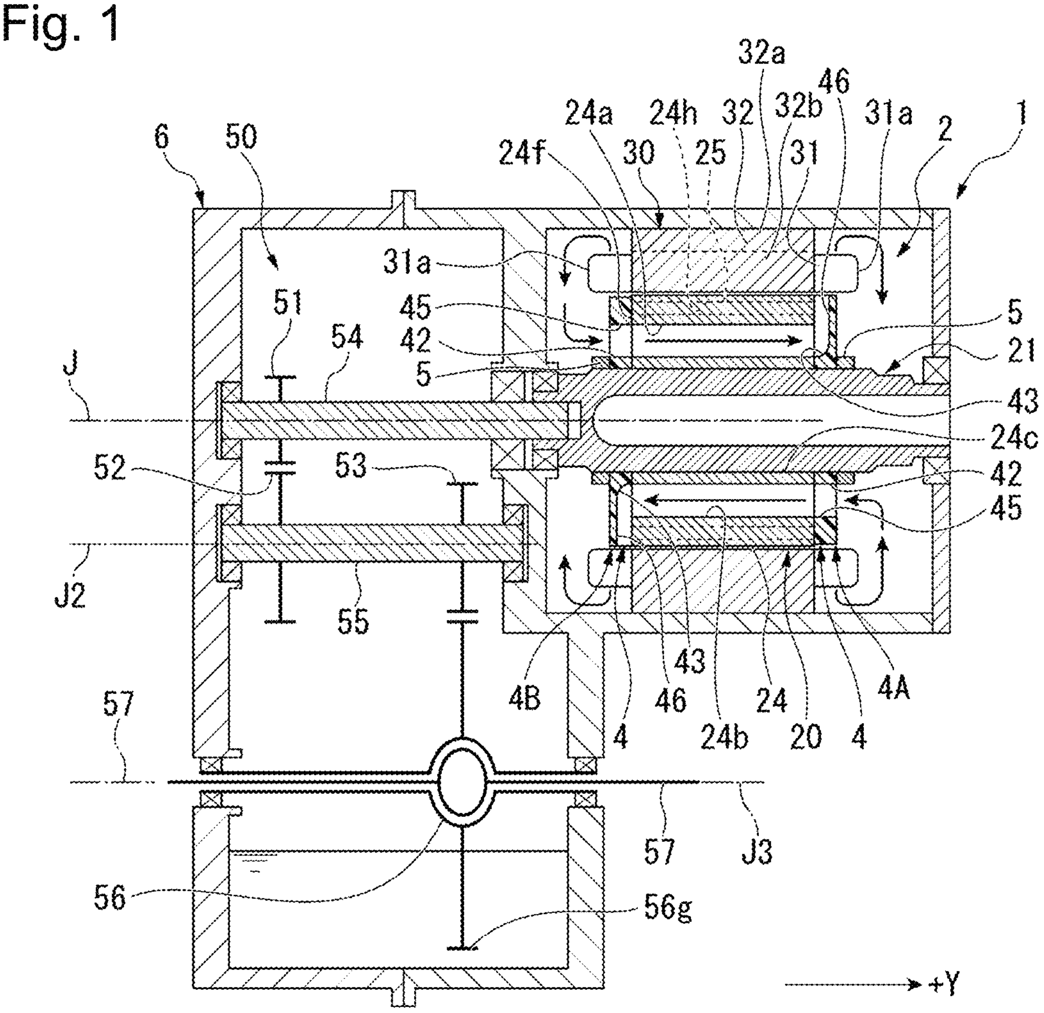
FIG. 1 is a conceptual diagram of a drive device of one embodiment.

FIG. 1 is a conceptual diagram of the drive device 1 of one embodiment.

The drive device 1 of the present embodiment is mounted on a vehicle using a rotating electrical machine as a power source, such as a hybrid electric vehicle (HEV), a plug-in hybrid electric vehicle (PHV), or an electric vehicle (EV), and is used as the power source.

The drive device 1 includes a rotating electrical machine 2, a power transmission unit 50, and a housing 6 accommodating the rotating electrical machine 2 and the power transmission unit 50. The drive device 1 may further include an inverter (not illustrated) that controls the rotating electrical machine 2.

The power transmission unit 50 is connected to a rotor 20 and transmits the power of the rotating electrical machine 2. The power transmission unit 50 includes a first shaft 54, a second shaft 55, a first gear 51, a second gear 52, a third gear 53, and a differential device 56. The differential device 56 includes a ring gear 56*g* and a pair of output shafts 57. A wheel (not illustrated) is connected to each of the pair of output shafts 57.

The first shaft 54 axially extends about the center axis J. The first shaft 54 is coupled to the rotor 20 of the rotating electrical machine 2 described later and rotates together with the rotor 20. The first gear 51 is provided on the outer peripheral surface of the first shaft 54. The second shaft 55 rotates about an intermediate axis J2 parallel to the center axis J. The second gear 52 and the third gear 53 are provided on the outer peripheral surface of the second shaft 55. The second gear 52 meshes with the first gear 51. The third gear 53 meshes with the ring gear 56*g* of the differential device 56. The differential device 56 transmits, to the output shaft 57, the torque transmitted from the third gear 53 while absorbing the speed difference between the left and right wheels when the vehicle turns. The torque output from the rotating electrical machine 2 is transmitted to the ring gear 56*g* of the differential device 56 via the first shaft 54, the first gear 51, the second gear 52, the second shaft 55, and the third gear 53, and is output to the pair of output shafts 57 via the differential mechanism portion of the differential device 56.

The rotating electrical machine 2 of the present embodiment is an inner rotor three-phase AC motor. The rotating electrical machine 2 has both a function of outputting power as a motor and a function of generating power as a generator. The rotating electrical machine 2 may be used as either a motor or a generator. The configuration of the rotating electrical machine 2 is not limited to that of the present embodiment, and may be, for example, a DC motor or an AC motor of four or more phases. The rotating electrical machine 2 includes the rotor 20 rotatable about the center axis J, and a stator 30 positioned radially outside the rotor 20.

The stator 30 is held by the housing 6. The stator 30 surrounds the rotor 20 from radially outside. The stator 30 includes a stator core 32 having a substantially annular shape about the center axis J, a coil 31 mounted on the stator core 32, and an insulator (not illustrated) interposed between the stator core 32 and the coil 31.

The stator core 32 includes a core back portion 32*a* having a substantially annular shape and a plurality of teeth portions 32*b* extending radially inward from the core back portion 32*a*. The core back portion 32*a* is held by the housing 6 by, for example, press-fitting, shrink fitting, bonding, a fixing member such as a bolt, or the like. The plurality of teeth portions 32*b* are arranged side by side along the circumferential direction. A coil wire is disposed between the teeth portions 32*b* arranged side by side in the circumferential direction. The coil wire positioned between the adjacent teeth portions constitutes the coil 31. The coil 31 includes a pair of coil ends 31*a* respectively protruding in the axial direction from the end surfaces on axial both sides of the stator core 32. The coil end 31*a* is configured by bundling coil wires.

The rotor 20 includes a shaft 21 extending axially about the center axis J, a rotor core 24 fixed to the outer peripheral surface of the shaft 21, a plurality of magnets 25 fixed to the rotor core 24, a pair of fans 4, and a pair of fixing members 5. The shaft 21 is rotatable about the center axis J.

The rotor core 24 has a columnar shape extending axially. The rotor core 24 includes an end surface 24*f* on each of the axial one side and the axial other side. That is, the rotor core 24 includes a pair of the end surfaces 24*f*. The end surface 24*f* on the axial one side of the rotor core 24 faces the axial one side, and the end surface 24*f* on the axial other side of the rotor core 24 faces the axial other side. The fan 4 is attached to each of the pair of end surfaces 24*f*. The rotor core 24 is made of a magnetic material. Although not illustrated, in the present embodiment, the rotor core 24 is configured by axially stacking a plurality of plate members. The plurality of plate members may be stacked with their circumferential positions shifted on a one by one basis or every a plurality of plate members. That is, the rotor core 24 may be skewed.

Figure 2:
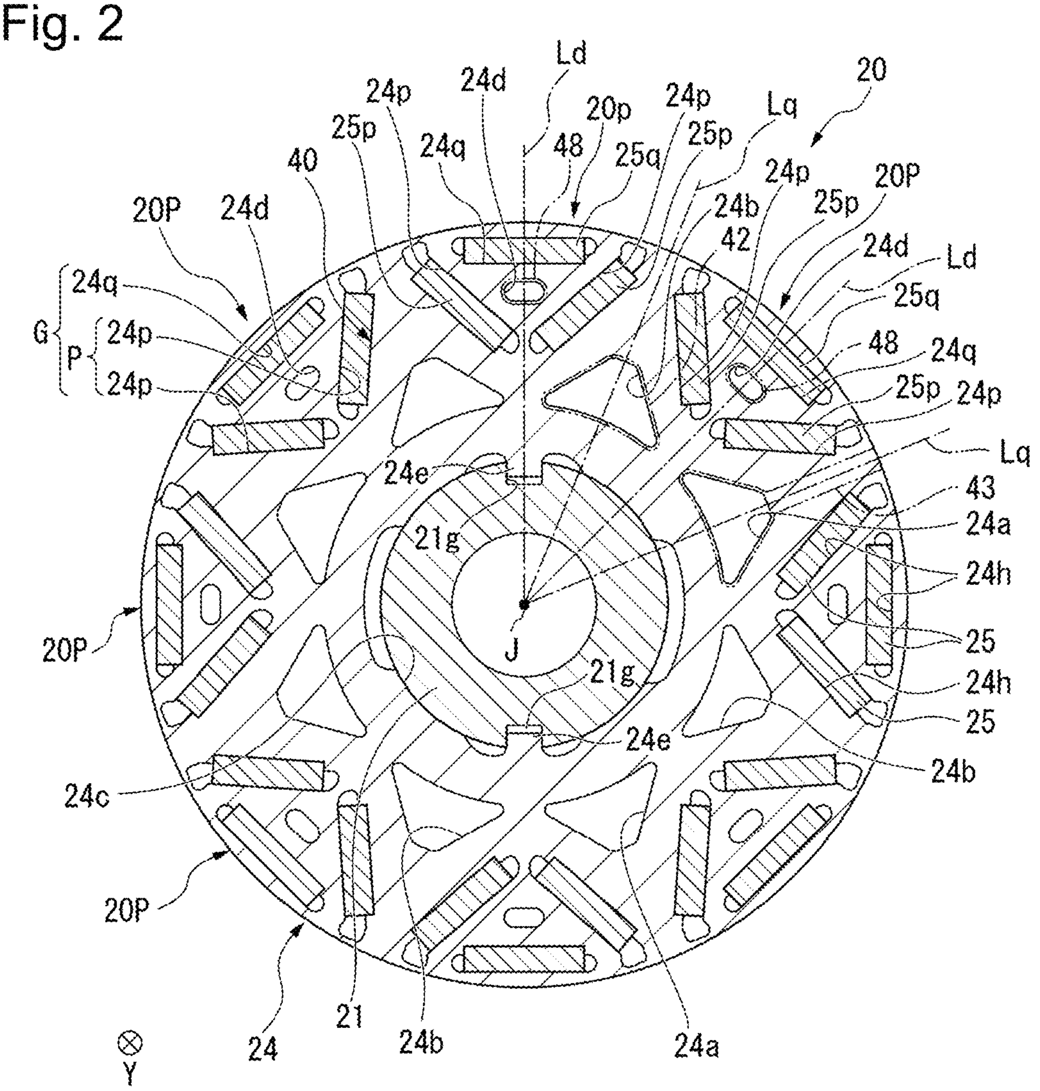
FIG. 2 is a cross-sectional view of a rotor of one embodiment.

FIG. 2 is a cross-sectional view of the rotor 20 of the present embodiment.

As illustrated in FIG. 2, the rotor 20 is provided with a plurality of magnetic poles 20P. The rotor 20 of the present embodiment is provided with eight magnetic poles 20P including four N poles and four S poles. The magnetic poles 20P of the N pole and the S pole are alternately disposed in the circumferential direction.

As illustrated in FIG. 2, a plurality of first virtual lines Ld and a plurality of second virtual lines Lq are assumed in the rotor 20. The first virtual line Ld passes on a d axis of the rotor 20 as viewed from the axial direction. The direction in which the first virtual line Ld extends is the d axis direction of the rotor 20. That is, the direction in which the first virtual line Ld extends is a main magnetic flux direction. On the other hand, the second virtual line Lq passes on a q axis of the rotor 20. The extending direction of the second virtual line Lq is the q axis direction of the rotor 20. The extending direction of the second virtual line Lq is electrically orthogonal to the extending direction of the first virtual line Ld. The first virtual line Ld and the second virtual line Lq are alternately provided along the circumferential direction. Although FIG. 2 illustrates only some of the first virtual lines Ld and some of the second virtual lines Lq, as many the first virtual lines Ld as the magnetic poles 20P and as many the second virtual lines Lq as the magnetic poles 20P are assumed in the rotor 20.

The rotor core 24 is provided with a center hole 24*c*, a plurality of vent holes 24*a* and 24*b*, a plurality of magnet holes 24*h*, and a plurality of second communication holes 24*d*. The center hole 24*c*, the vent holes 24*a* and 24*b*, the magnet hole 24*h*, and the second communication hole 24*d* extend axially and penetrate the rotor core 24 axially. The center hole 24*c*, the vent holes 24*a* and 24*b*, the magnet hole 24*h*, and the second communication hole 24*d* open axially on each of the pair of end surfaces 24*f* of the rotor core 24.

The center hole 24*c* extends along the axial direction about the center axis J. In the present embodiment, the center hole 24*c* has a substantially circular shape as viewed from the axial direction. The shaft 21 is inserted into the center hole 24*c*. The shaft 21 is fixed to the inner surface of the center hole 24*c*.

The inner surface of the center hole 24*c* is provided with two first protrusion portions 24*e* protruding radially inward. The first protrusion portion 24*e* extends linearly along the axial direction. The two first protrusion portions 24*e* are disposed on the opposite side with respect to the center axis J. On the other hand, the outer peripheral surface of the shaft 21 is provided with two key grooves 21*g* recessed radially inward. The key groove 21*g* extends linearly in the axial direction. The first protrusion portion 24*e* is inserted into the key groove 21*g*. Due to this, the rotor core 24 is positioned circumferentially with respect to the shaft 21.

The plurality of vent holes 24*a* and 24*b* are arranged side by side along the circumferential direction. In the present embodiment, the plurality of vent holes 24*a* and 24*b* are disposed at equal intervals along the circumferential direction. The vent holes 24*a* and 24*b* are disposed on the second virtual line Lq as viewed from the axial direction. The vent holes 24*a* and 24*b* have a shape protruding radially outward as viewed from the axial direction. More specifically, the vent holes 24*a* and 24*b* of the present embodiment have a substantially triangular shape with rounded corners protruding radially outward as viewed from the axial direction. The shape of the vent holes 24*a* and 24*b* is not limited to that of the present embodiment. The shape of the vent holes 24*a* and 24*b* may be, for example, a circular shape, an elliptical shape, a polygonal shape, or a shape in which at least a part protrudes circumferentially or radially as viewed from the axial direction.

The plurality of vent holes 24*a* and 24*b* include a first vent hole 24*a* and a second vent hole 24*b*. That is, the rotor core 24 is provided with the first vent hole 24*a* and the second vent hole 24*b*. In the present embodiment, the first vent hole 24*a* and the second vent hole 24*b* are alternately arranged side by side along the circumferential direction. The rotor 20 of the present embodiment is provided with four first vent holes 24*a* and four second vent holes 24*b*. In the present embodiment, the shapes of the first vent hole 24*a* and the second vent hole 24*b* are equal to each other. The first vent hole 24*a* and the second vent hole 24*b* have different flow directions of air flowing inside. The shapes of the first vent hole 24*a* and the second vent hole 24*b* may be different from each other.

The plurality of magnet holes 24*h* are arranged side by side along the circumferential direction. The magnet 25 is disposed inside the magnet hole 24*h*. The plurality of magnet holes 24*h* include a plurality of first magnet holes 24*q* and a plurality of second magnet holes 24*p*. The number of the second magnet holes 24*p* of the present embodiment is twice the number of the first magnet holes 24*q*. A total of three magnets 25 disposed in one first magnet hole 24*q* and two second magnet holes 24*p* constitute one magnetic pole 20P. Here, a set of three magnet holes 24*h* accommodating the three magnets 25 constituting one magnetic pole 20P is called a hole group G. The two second magnet holes 24*p* belonging to one hole group G is called a hole pair P. The rotor core 24 of the present embodiment is provided with eight sets of hole groups G. One hole group G includes one first magnet hole 24*q* and one hole pair P. The two second magnet holes 24*p* of one hole pair P are circumferentially adjacent to each other. That is, the rotor core 24 of the present embodiment is provided with only eight pairs of second magnet holes 24*p* circumferentially adjacent to each other.

The two second magnet holes 24*p* of the hole pair P are disposed symmetrically with respect to the first virtual line Ld as viewed from the axial direction. The second magnet hole 24*p* on the circumferential one side (+θ side) with respect to the first virtual line Ld extends toward the circumferential one side (+θ side) as it goes radially outward. The second magnet hole 24*p* on the circumferential other side (−θ side) with respect to the first virtual line Ld extends toward the circumferential other side (−θ side) as it goes radially outward. That is, the pair of second magnet holes 24*p* of the hole pair P are disposed apart from each other in the circumferential direction, and extend in directions circumferentially away from each other from the radial inside toward the radial outside as viewed from the axial direction. The first magnet hole 24*q* is disposed between radially outer end portions of the pair of second magnet holes 24*p* belonging to the same hole group G, and extends along the circumferential direction.

The plurality of second communication holes 24*d* are arranged side by side along the circumferential direction. The second communication hole 24*d* of the present embodiment is disposed on the first virtual line Ld. The second communication hole 24*d* is surrounded by the three magnet holes 24*h* of the hole group G as viewed from the axial direction. The second communication hole 24*d* is positioned circumferentially between the pair of second magnet holes 24*p* constituting the hole pair P. The second communication hole 24*d* of the present embodiment has a long hole shape extending linearly in a direction orthogonal to the radial direction as viewed from the axial direction. However, the shape of the second communication hole 24*d* is not limited to that of the present embodiment.

One magnet 25 is disposed in each magnet hole 24*h*. In the present embodiment, the magnet 25 is fixed to the inner surface of the magnet hole 24*h* by a fixing means such as an adhesive. The magnet 25 may be fixed in the magnet hole 24*h* by a fixing means such as cramping or press-fitting. The type of the magnet 25 is not particularly limited. The magnet 25, for example, may be a neodymium magnet or may be a ferrite magnet. In the present embodiment, the magnet 25 has a cuboid shape elongated in the axial direction. Therefore, the magnet 25 of the present embodiment has a rectangular shape as viewed from the axial direction. More specifically, the magnet 25 of the present embodiment has a substantially rectangular shape as viewed from the axial direction. The magnet 25 extends from an axial one end portion to the axial other end portion of the rotor core 24, for example. The axial dimension of the magnet 25 may be shorter than the axial dimension of the rotor core 24 (the axial dimension of the magnet hole 24*h*). The shape of the magnet 25 is not limited to the above-described shape. The magnet 25 disposed in one first magnet hole 24*q* may include a plurality of magnets. The magnet 25 disposed in the second magnet hole 24*p* may include a plurality of magnets. The type of the magnet disposed in the first magnet hole 24*q* may be different from the type of the magnet disposed in the second magnet hole 24*p*.

In the description below, the magnet 25 disposed in the first magnet hole 24*q* is called a first magnet 25*q*, and the magnet 25 disposed in the second magnet hole 24*p* is called a second magnet 25*p*. The magnetic pole 20P includes a total of three magnets 25 including one first magnet 25*q* and two second magnets 25*p*. The number of the second magnets 25*p* of the present embodiment is twice the number of the first magnets 25*q*.

The first magnet 25*q* is disposed with the long direction orthogonal to the first virtual line Ld as viewed from the axial direction. The two second magnets 25*p* belonging to one magnetic pole 20P are disposed symmetrically in the circumferential direction with respect to the first virtual line Ld on the radial inside of the first magnet 25*q*. Furthermore, in one magnetic pole 20P, the two second magnets 25*p* are separated from each other toward the radial outside. The thickness direction of each of the first magnet 25*q* and the second magnet 25*p* is a magnetization direction. The first magnet 25*q* constituting one magnetic pole 20P and the two second magnet holes 24*p* direct the same pole radially outward. For example, when the surface facing the radial outside of the first magnet 25*q* is the N pole (or the S pole), the surface facing the radial outside of the two second magnet holes 24*p* is also the N pole (or the S pole).

The fan 4 is attached to each of end surfaces 24*f* on the axial one side and other side of the rotor core 24. The fan 4 is disposed between the rotor core 24 and the fixing member 5 in the axial direction. The fixing member 5 is a substantially annular member, and is press-fitted into the outer peripheral surface of the shaft 21. Due to this, the fixing member 5 is fixed to the shaft 21. By sandwiching the fan 4 between the fixing member 5 and the rotor core 24, the fixing member 5 suppresses the fan 4 from separating from the shaft 21 in the axial direction.

The pair of fans 4 rotate around the center axis J together with the rotor core 24. The fans 4 are positioned radially inside the coil end 31*a* on the axial one side and other side, respectively. In the present embodiment, the pair of fans 4 have the same shapes as each other. As described later, the pair of fans 4 have attachment angles around the center axis J different from each other with respect to the rotor core 24.

The fan 4 of the present embodiment is made of an aluminum alloy, and is formed by aluminum die casting, for example. The fan 4 may be made of a resin material or may be made of another metal material. The fan 4 may be formed not only by aluminum die casting but also by other methods such as cutting and pressing.

The fan 4 of the present embodiment covers the end surface 24*f* of the rotor core 24. The fan 4 covers the plurality of magnet holes 24*h* of the rotor core 24. This can suppress separation of the magnet 25 from the magnet hole 24*h*. Even when a part of the magnet 25 is lost, the fan 4 can suppress fragments of the magnet 25 from separating from the rotor 20. That is, according to the present embodiment, it is not necessary to provide a separate member such as a plate for covering the opening of the magnet hole 24*h* between the fan 4 and the rotor core 24, and the rotor 20 can be manufactured at low cost with the reduced number of components.

The fan 4 is provided with a plurality of inflow paths 45 and a plurality of outflow paths 46. The plurality of inflow paths 45 and the plurality of outflow paths 46 are respectively connected to any of the plurality of vent holes 24*a* and 24*b*. Here, of the pair of fans 4, the one positioned on the +Y side of the rotor core 24 is called a first fan 4A, and the other positioned on the −Y side of the rotor core 24 is called a second fan 4B. The first fan 4A and the second fan 4B have different attachment angles around the center axis J with respect to the rotor core 24. The inflow path 45 of the first fan 4A is connected to the second vent hole 24*b*, and the outflow path 46 of the first fan 4A is connected to the first vent hole 24*a*. On the other hand, the inflow path 45 of the second fan 4B is connected to the first vent hole 24*a*, and the outflow path 46 of the first fan 4A is connected to the second vent hole 24*b*. That is, the first vent hole 24*a* and the second vent hole 24*b* connect the inflow path 45 of one fan 4 of the pair of fans 4 and the outflow path 46 of the other fan 4, respectively.

The outflow path 46 extends along the radial direction and opens radially outward. When the rotor 20 rotates, centrifugal force associated with rotation around the center axis J of the fan 4 is applied to the air inside the outflow path 46. Due to this, the air inside the outflow path 46 is blown radially outward. When air is blown out from outflow path 46, negative pressure is generated inside the vent holes 24*a* and 24*b* connected to the outflow path 46. Due to this, air flows into the vent holes 24*a* and 24*b* via the inflow path 45. An air flow along the axial direction is formed in the vent holes 24*a* and 24*b*.

According to the present embodiment, air flows axially in the vent holes 24*a* and 24*b*, whereby the inside of the rotor 20 can be cooled by the air flowing inside the rotor 20. According to the present embodiment, the air inside the first vent hole 24*a* and the air inside the second vent hole 24*b* flow in directions opposite to each other in the axial direction. Therefore, in the rotor 20, the reaction force of the air resistance applied to the inner surface of the first vent hole 24*a* and the reaction force of the air resistance applied to the inner surface of the second vent hole 24*b* cancel each other. According to the present embodiment, it is possible to suppress application of a biased force to the rotor 20 due to the reaction force of the air resistance, and it is possible to suppress deterioration of the rotation balance of the rotor 20.

Figure 3:
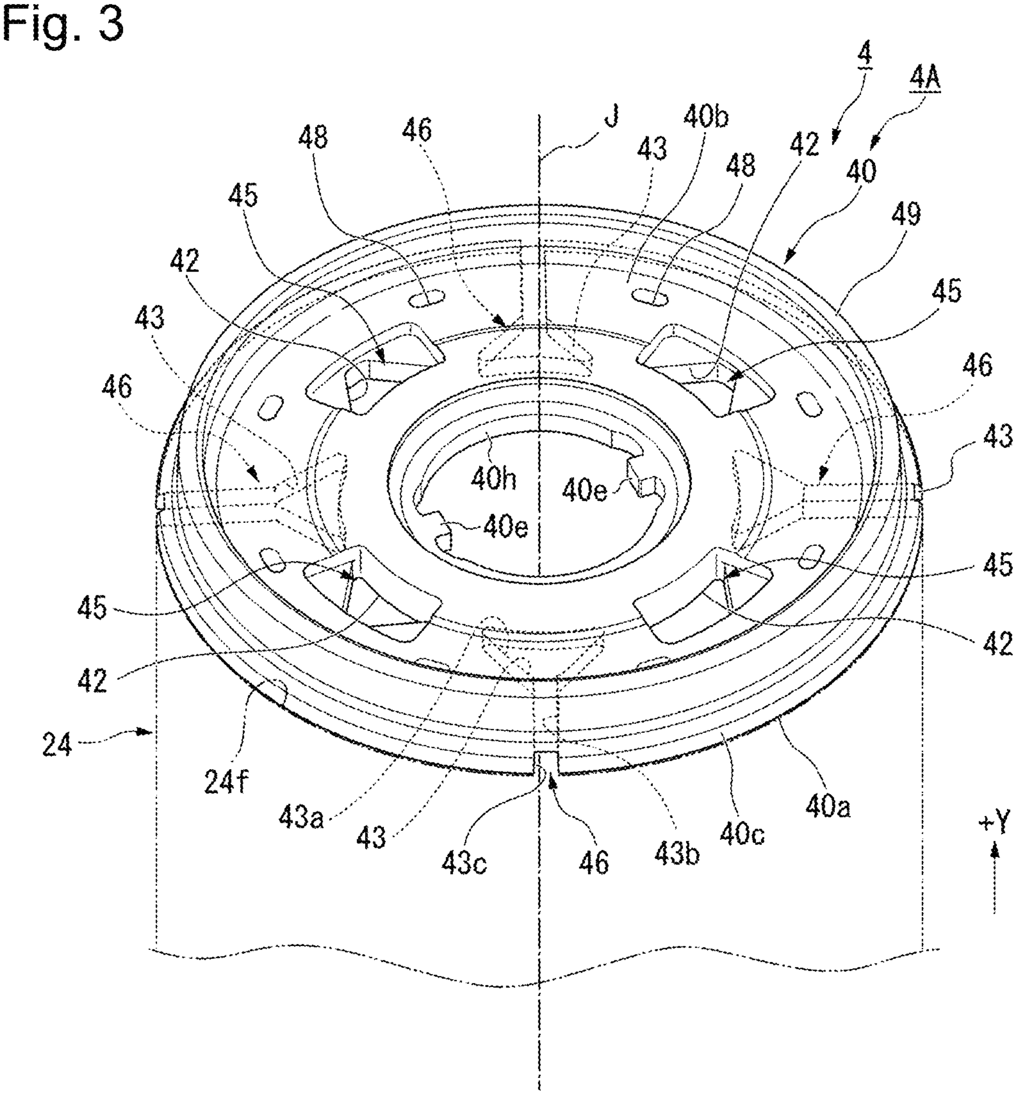
FIG. 3 is a perspective view of a fan of one embodiment.
Figure 4:
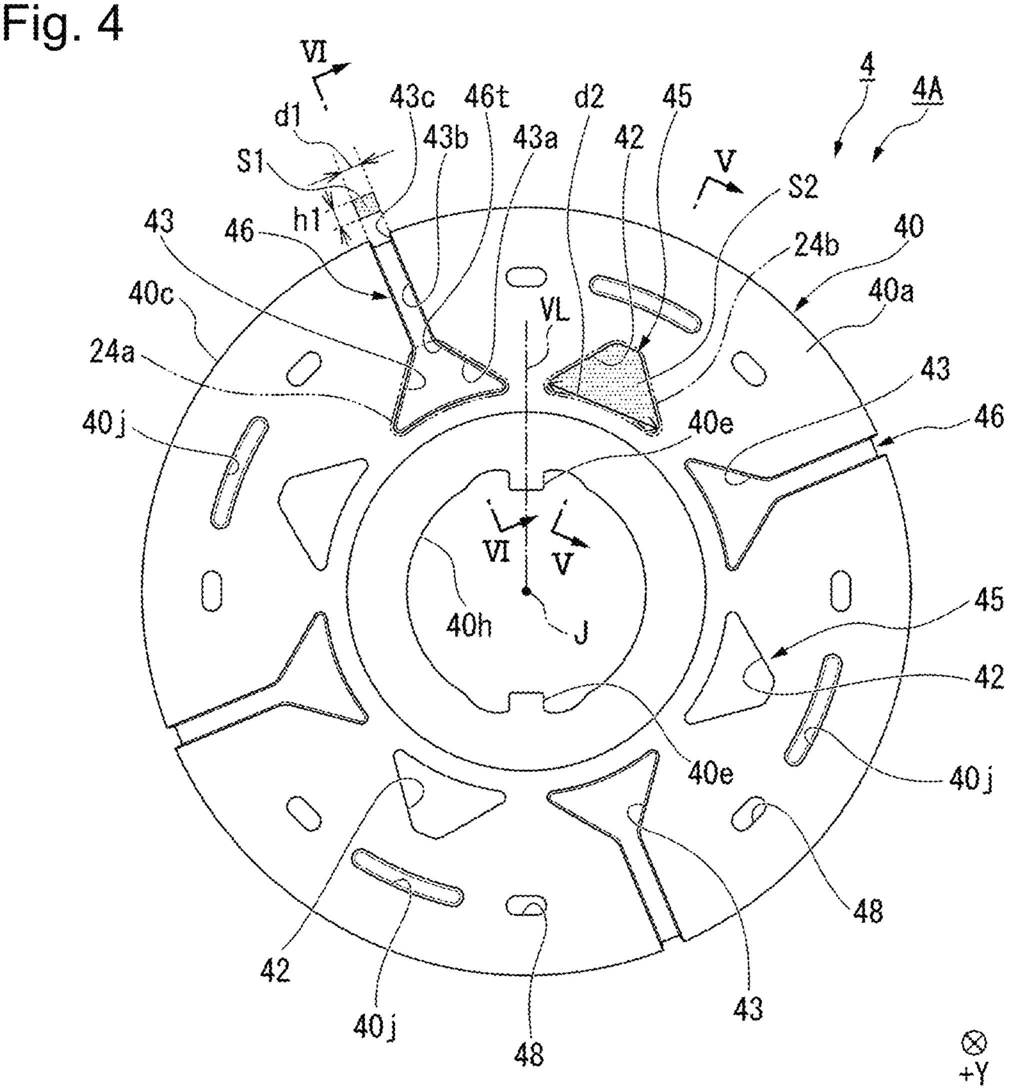
FIG. 4 is a rear view of the fan of one embodiment.

FIG. 3 is a perspective view of the fan 4, and FIG. 4 is a rear view of the fan 4.

The first fan 4A and the second fan 4B have the same configuration except that attachment postures to the rotor core 24 are different. In the description below, the position and shape of each part of the pair of fans 4 will be described based on the posture of the first fan 4A with respect to the Y axis. In the description of the fan 4 below, the direction in which the end surface 24*f* of the attached rotor core 24 faces is the axial one side (+Y side), and the opposite direction is the axial other side (−Y side).

As illustrated in FIG. 3, the fan 4 includes a body portion 40 and a rib 49. The body portion 40 has a plate shape extending orthogonal to the axial direction. The body portion 40 has a substantially circular shape about the center axis J as viewed from the axial direction. That is, the body portion 40 has a substantially disk shape. The body portion 40 includes a first surface 40*a* facing the axial other side (−Y side), a second surface 40*b* facing the axial one side (+Y side), and an outer surface 40*c* facing radially outside. That is, the fan 4 includes the first surface 40*a*, the second surface 40*b*, and the outer surface 40*c*. Each of the first surface 40*a* and the second surface 40*b* has a planar shape orthogonal to the axial direction. The first surface 40*a* faces and comes into contact with the end surface 24*f* of the rotor core 24. The outer surface 40*c* is positioned radially outside the first surface 40*a*. In other words, the outer surface 40*c* is positioned radially outside the second surface 40*b*. The outer surface 40*c* is connected to the first surface 40*a* and the second surface 40*b*. The second surface 40*b* is positioned on the opposite side of the first surface 40*a* in the axial direction.

As illustrated in FIG. 4, the body portion 40 is provided with a second shaft insertion hole 40*h*, a plurality of through holes (second through holes) 42, a plurality of first communication holes 48, a plurality of first recess portions 43, and a plurality of lightening recess portions 40*j*. That is, the fan 4 includes the second shaft insertion hole 40*h*, the plurality of through holes 42, the plurality of first communication holes 48, the plurality of first recess portions 43, and the plurality of lightening recess portions 40*j*. The second shaft insertion hole 40*h*, the through holes 42, and the first communication holes 48 penetrate the fan 4 in the axial direction.

As viewed from the axial direction, the second shaft insertion hole 40*h* has a substantially circular shape about the center axis J. The shaft 21 is inserted into the second shaft insertion hole 40*h*. The inner diameter of the second shaft insertion hole 40*h* is larger than the outer diameter of the shaft 21. The inner surface of the second shaft insertion hole 40*h* is provided with a plurality of second protrusion portions 40*e* protruding radially inward. In the present embodiment, the inner surface of the second shaft insertion hole 40*h* is provided with two second protrusion portions 40*e* protruding radially inward. That is, the fan 4 includes the second protrusion portions 40*e* protruding radially inward from the inner surface of the second shaft insertion hole 40*h*. The two second protrusion portions 40*e* are disposed on the opposite side with respect to the center axis J. The second protrusion portion 40*e* is disposed in the key groove 21*g*. Due to this, the rotor core 24 is positioned circumferentially with respect to the shaft 21.

Here, when the fan 4 is viewed in the axial direction, a virtual line VL connecting the circumferential center of the second protrusion portion 40*e* and the center axis J is assumed. In the present embodiment, the virtual line VL is positioned between the through holes 42 circumferentially adjacent to each other. That is, the virtual line VL does not overlap the through hole 42 as viewed from the axial direction. The second protrusion portion 40*e* receives a force from the inner surface of the key groove 21*g* when the rotor 20 rotates. Therefore, a large stress is applied to the root of the second protrusion portion 40*e* during rotation. On the other hand, the through hole 42 constituting the inflow path 45 or the outflow path 46 may be made larger than a certain size to allow air to pass therethrough. In this case, the rigidity of the fan 4 may decrease in the vicinity of the through hole 42. According to the present embodiment, since the virtual line VL passing through the circumferential center of the second protrusion portion 40*e* is disposed avoiding the through hole 42, the rigidity of the root part of the second protrusion portion 40*e* can be suppressed from decreasing due to the influence of the through hole 42. This can suppress the fan 4 from deforming due to the force received by the protrusion portion 40*e* during rotation. As described later, the through holes 42 of the present embodiment constitute the inflow path 45. However, the through holes disposed avoiding the virtual line VL are not limited to those constituting the inflow path 45, and include those constituting the outflow path 46. That is, the through holes circumferentially adjacent to each other through which the virtual line VL passes between may constitute at least a part of either the inflow path 45 or the outflow path 46. Examples in which a part of the outflow path 46 is constituted by a through hole include a fan 204 (see FIG. 9) of modification 2 described later.

As illustrated in FIG. 4, four through holes 42 of the present embodiment are provided in the fan 4. The plurality of through holes 42 are arranged side by side in the circumferential direction. The plurality of through holes 42 of the present embodiment are arranged side by side at equal intervals in the circumferential direction. The through hole 42 overlaps the second vent hole 24*b* as viewed from the axial direction. The through hole 42 guides air to the second vent hole 24*b*. That is, the through hole 42 constitutes the inflow path 45. The inflow path 45 axially extends. Therefore, the flow path cross-sectional area of the inflow path 45 of the present embodiment can be defined as the cross-sectional area of the through hole 42 in the cross section orthogonal to the axial direction. In the present description, the "flow path cross-sectional area" means a cross-sectional area of a flow path in a cross section orthogonal to the flow direction of the fluid flowing in the flow path. The through hole 42 may entirely overlap or may at least partially overlap the second vent hole 24*b* as viewed from the axial direction.

The opening in the first surface 40*a* of the through hole 42 has a shape protruding in at least one direction as viewed from the axial direction. The opening in the first surface 40*a* of the through hole 42 of the present embodiment has a substantially triangular shape with rounded corners protruding radially outward as viewed from the axial direction. In the present embodiment, the shape of the opening in the first surface 40*a* of the through hole 42 is substantially the same as the shape of the opening in the end surfaces 24*f* of the vent holes 24*a* and 24*b*. However, the shape of the opening of the through hole 42 is not limited. The shape of the opening in the first surface 40*a* of the through hole 42 may be different from the shape of the opening in the end surfaces 24*f* of the vent holes 24*a* and 24*b*. The shape of the opening in the first surface 40*a* of the through hole 42 is the same as either the vent hole 24*a* or the vent hole 24*b*, and may be different from the other.

Figure 5:
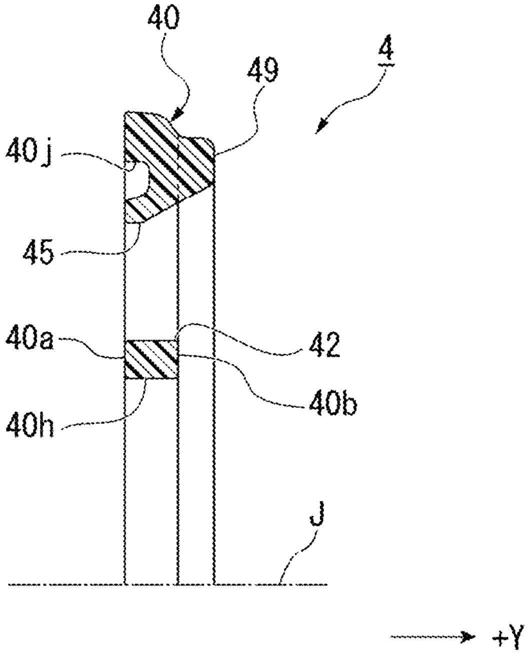
FIG. 5 is a cross-sectional view of the fan taken along line V-V of FIG. 4.

FIG. 5 is a cross-sectional view of the fan 4 taken along line V-V of FIG. 4. The through hole 42 opens to the first surface 40*a* and the second surface 40*b*. As illustrated in FIG. 3, in the present embodiment, the opening in the second surface 40*b* of the through hole 42 has a substantially rectangular shape as viewed from the axial direction. Therefore, the flow path cross-sectional shape of the through hole 42 changes along the axial direction. The area of the opening in the second surface 40*b* of the through hole 42 is larger than the area of the opening in the first surface 40*a* of the through hole 42. The cross-sectional area in the cross section orthogonal to the center axis J of the through hole 42 increases toward the axial one side (+Y side).

As illustrated in FIG. 4, in the present embodiment, four first recess portions 43 are provided in the fan 4. The first recess portion 43 is provided on the first surface 40*a*. The plurality of first recess portions 43 of the present embodiment are arranged side by side at equal intervals in the circumferential direction. The first recess portion 43 is disposed between the two through holes 42 arranged side by side in the circumferential direction. That is, the through holes 42 and the first recess portions 43 are alternately arranged side by side in the circumferential direction. The first recess portion 43 overlaps the first vent hole 24*a* as viewed from the axial direction.

The first recess portion 43 includes a connection portion 43*a* overlapping the first vent hole 24*a* as viewed from the axial direction, a groove portion 43*b* extending radially outward from the connection portion 43*a*, and an opening portion (first opening portion) 43*c* opening to the outer surface 40*c*. The connection portion 43*a* desirably has a shape protruding radially outward as viewed from the axial direction. The connection portion 43*a* of the present embodiment has a substantially triangular shape with rounded corners protruding radially outward as viewed from the axial direction. The shape of the connection portion 43*a* viewed from the axial direction is substantially the same as the shape of the opening in the end surfaces 24*f* of the vent holes 24*a* and 24*b*. The groove portion 43*b* is connected to the radially outer end portion of the connection portion 43*a*. The groove portion 43*b* faces the end surface 24*f* of the rotor core 24 in the axial direction. The radially inner end portion of the groove portion 43*b* is connected to the connection portion 43*a*. The radially outer end portion of the groove portion 43*b* constitutes an opening portion 43*c*. The shape of the first recess portion 43 viewed from the axial direction is not limited.

Figure 6:
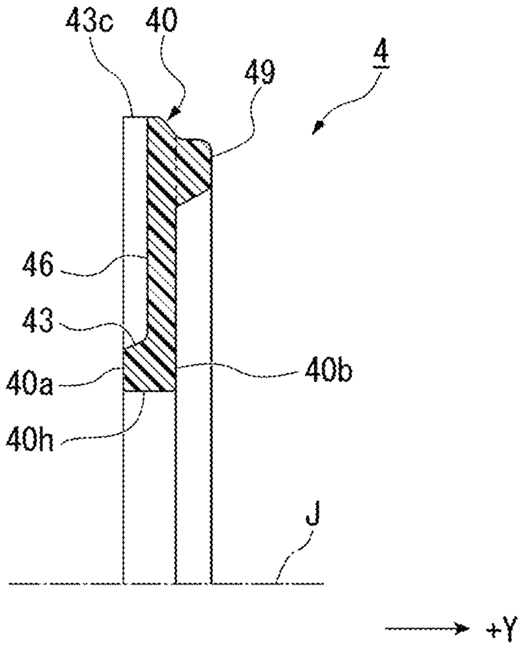
FIG. 6 is a cross-sectional view of the fan taken along line VI-VI of FIG. 4.

FIG. 6 is a cross-sectional view of the fan 4 taken along line VI-VI of FIG. 4. The first recess portion 43 of the present embodiment is recessed to the axial one side (+Y side) with respect to the first surface 40*a* with a uniform depth over the entire first recess portion 43. However, the depth of the first recess portion 43 is not necessarily uniform.

A space surrounded by the first recess portion 43 and the end surface 24*f* of the rotor core 24 functions as the outflow path 46 guiding radially outward the air in the first vent hole 24*a*. That is, at least a part of the outflow path 46 is provided in a space surrounded by the end surface 24*f* of the rotor core 24 and the first recess portion 43. The region on the upstream side of the outflow path 46 of the present embodiment is provided inside the connection portion 43*a*, and the region on the downstream side is provided inside the groove portion 43*b*. The first recess portion 43 extends along the radial direction and opens on the outer surface 40*c*. That is, the outflow path 46 extends radially. Therefore, the flow path cross-sectional area of the outflow path 46 of the present embodiment can be defined as the cross-sectional area of the first recess portion 43 in the cross section orthogonal to the radial direction.

As illustrated in FIG. 3, in the present embodiment, the opening portion 43*c* of the first recess portion 43 has a substantially rectangular shape as viewed from the radial direction. The opening portion 43*c* faces radially outward. When the rotor 20 rotates, the opening portion 43*c* functions as a blowout port for blowing out the air in the outflow path 46. The opening portion 43*c* faces the coil end 31*a* in the radial direction. The air blown out from the opening portion 43*c* during the rotation of the rotor 20 hits the coil end 31*a* and can cool the coil end 31*a*.

As illustrated in FIG. 4, the circumferential dimension of the connection portion 43*a* gradually decreases toward the radial outside. Therefore, in the outflow path 46, the flow path cross-sectional area gradually decreases in the region provided in the connection portion 43*a*. A region provided in the connection portion 43*a* of the outflow path 46 is called a narrow portion (first narrow portion) 46*t*. That is, the outflow path 46 includes the narrow portion 46*t* in which the flow path cross-sectional area decreases toward the radial outside. On the other hand, the groove portion 43*b* of the present embodiment extends to the opening portion 43*c* with a uniform width and depth over the entire length. Therefore, the outflow path 46 has a substantially constant flow path cross-sectional area from the radially inner end portion of the groove portion 43*b* to the opening portion 43*c*. The flow path cross-sectional area of the outflow path 46 is smaller on the downstream side than on the upstream side. Here, the flow path cross-sectional area of the outflow path 46 in the opening portion 43*c* is called an opening flow path cross-sectional area S1. The opening flow path cross-sectional area S1 of the present embodiment is the minimum flow path cross-sectional area of the outflow path 46.

The flow path cross-sectional area of the outflow path 46 of the present embodiment becomes minimum at the opening portion 43*c*. According to the present embodiment, the flow velocity of the air flowing through the outflow path 46 can be maximized in the opening portion 43*c*. This can increase the flow velocity of the air blown out from the outflow path 46 to the coil end 31*a* through the opening portion 43*c*, and can efficiently cool the coil end 31*a*.

The outflow path 46 of the present embodiment is provided with the narrow portion 46*t* continuously decreasing the flow path cross-sectional area toward the radial outside. By providing the outflow path 46 with the narrow portion 46*t*, it is possible to increase the flow velocity of the air in the outflow path 46 while suppressing the pressure loss as compared with a case of rapidly reducing the flow path cross-sectional area. This can increase the flow velocity of the air blown out from the outflow path 46 to the coil end 31*a* through the opening portion 43*c*.

As illustrated in FIG. 5, the flow path cross-sectional area of the inflow path 45 increases toward the axial one side (+Y side). That is, the flow path cross-sectional area of the inflow path 45 increases with distance from the rotor core 24 side. The flow path cross-sectional area of the inflow path 45 is maximized at the opening in the second surface 40*b* of the through hole 42. On the other hand, the flow path cross-sectional area of the inflow path 45 becomes minimum at the opening in the first surface 40*a* of the through hole 42, and substantially coincides with the flow path cross-sectional areas of the vent holes 24*a* and 24*b*. According to the inflow path 45 of the present embodiment, it is possible to guide more air to the vent holes 24*a* and 24*b* by opening largely toward the outside.

In the present embodiment, the inflow path 45 has the minimum flow path cross-sectional area at the opening in the first surface 40*a*. Here, the flow path cross-sectional area of the inflow path 45 at a location where the flow path cross-sectional area of the inflow path 45 becomes minimum is called a minimum flow path cross-sectional area S2 of the inflow path 45. The minimum flow path cross-sectional area S2 of the outflow path 46 is positioned at the end portion on the axial other side (−Y side) of the inflow path 45.

As illustrated in FIG. 4, the opening flow path cross-sectional area S1 of the outflow path 46 of the present embodiment is smaller than the minimum flow path cross-sectional area S2 of the inflow path 45. That is, the opening flow path cross-sectional area S1 is smaller than the flow path cross-sectional area at any position of the inflow path 45. The inflow path 45 and the outflow path 46 are connected to each other via the vent holes 24*a* and 24*b* of the rotor core 24. According to the present embodiment, by making the opening flow path cross-sectional area S1 of the outflow path 46 smaller than the flow path cross-sectional area of the inflow path 45, it is possible to make the flow velocity of the air blown out from the opening portion 43*c* of the outflow path 46 higher than the flow velocity of the air passing through the inflow path 45. This can efficiently cool the coil ends 31*a*. In addition, according to the present embodiment, by making the flow path cross-sectional area of the inflow path 45 larger than the opening portion 43*c* of the outflow path 46, the inflow path 45 can guide more air to the outflow path 46 via the vent holes 24*a* and 24*b*. The pressure loss of the air flowing through the inflow path 45 can be reduced, and the flow velocity of the air blown out from the opening portion 43*c* of the outflow path 46 can be further increased.

In the present embodiment, a circumferential dimension d1 of the opening portion 43*c* is smaller than a circumferential dimension d2 of the opening of the through hole 42 in the first surface 40*a*. That is, the circumferential dimension d1 of the opening portion 43*c* is smaller than the circumferential dimension d2 of the inflow path 45 at the part having the minimum flow path cross-sectional area S2. According to the present embodiment, in the outflow path 46, by reducing the circumferential dimension d1 of the opening portion 43*c*, the opening flow path cross-sectional area S1 can be reduced while securing a sufficiently large axial dimension h1 of the opening portion 43*c*. This enables the outflow path 46 to blow out the air to an axial wide range while reducing the opening flow path cross-sectional area S1, and can cool the axial wide range of the coil end 31*a*. Since the rotor 20 rotates around the center axis J, even if the circumferential dimension d1 of the opening portion 43*c* of the outflow path 46 decreases, the air can be blown out to a circumferential wide range.

As illustrated in FIG. 2, the first recess portion 43 and the through hole 42 of the present embodiment are provided at positions different from the magnet holes 24*h* as viewed from the axial direction. That is, the outflow path 46 and the inflow path 45 of the present embodiment do not communicate with the magnet hole 24*h*. Therefore, even when a part of the magnet 25 is lost inside the magnet hole 24*h*, it is possible to suppress fragments of the magnet 25 from scattering to the outside of the rotor 20 via the outflow path 46 and the inflow path 45.

The first recess portion 43 of the present embodiment overlaps the second virtual line Lq. That is, the first recess portion 43 extends radially outward from the first vent hole 24*a* side toward the outer surface 40*c* and axially overlaps the second virtual line Lq of the rotor 20. According to the present embodiment, the plurality of first recess portions 43 can be disposed in a well-balanced manner between the plurality of magnet holes 24*h* arranged side by side in the circumferential direction. By disposing the groove portion 43*b* of the first recess portion 43 in a groove shape along the second virtual line Lq, the groove portion 43*b* can have a linear shape, and the groove portion 43*b* can be disposed avoiding the magnet hole 24*h* while suppressing the pressure loss of the air in the groove portion 43*b*.

Note that the arrangement and shape of the first recess portion 43 of the present embodiment are merely examples, and various other configurations can be adopted. A part of the first recess portion 43 may be disposed on the first virtual line Ld, for example, or may be disposed between the first virtual line Ld and the second virtual line Lq.

As illustrated in FIG. 4, eight first communication holes 48 of the present embodiment are provided in the fan 4. The plurality of first communication holes 48 are disposed along the circumferential direction. In the present embodiment, the plurality of first communication holes 48 are disposed at equal intervals along the circumferential direction. The first communication hole 48 has a long hole shape of which the direction orthogonal to the radial direction is the long direction as viewed from the axial direction. The first communication hole 48 opens on the first surface 40*a* and the second surface 40*b* of the body portion 40. In the present embodiment, the first communication hole 48 has a uniform cross-sectional shape and extends along the axial direction.

As indicated by a two-dot chain line in FIG. 2, the first communication hole 48 overlaps the second communication hole 24*d* as viewed from the axial direction. In the present embodiment, the shape of the opening in the first surface 40*a* of the first communication hole 48 is substantially the same as the shape of the opening in the end surface 24*f* of the second communication hole 24*d*. The first communication hole 48 and the second communication hole 24*d* communicate with each other. As long as the first communication hole 48 and the second communication hole 24*d* communicate with each other, the shape of the opening in the first surface 40*a* of the first communication hole 48 may be different from the shape of the opening in the end surface 24*f* of the second communication hole 24*d*.

The rotor core 24 of the present embodiment is provided with the second communication hole 24*d* communicating with the first communication hole 48 of the fan 4. The second communication hole 24*d* is positioned between the pair of second magnet holes 24*p* of one hole pair P. The magnets 25 constituting the same magnetic pole 20P are disposed in the pair of second magnet holes 24*p* of the hole pair P. For this reason, the temperature of the region between the pair of second magnet holes 24*p* of the rotor core 24 may increase with the heat generation of the magnet 25. Furthermore, the temperature of the region between the pair of second magnet holes 24*p* of the rotor core 24 may increase due to an eddy current generated by passage of a high-density magnetic flux. According to the present embodiment, the second communication hole 24*d* is provided between the pair of second magnet holes 24*p* constituting the hole pair P of the rotor core 24. Due to this, air flows into the second communication hole 24*d* via the first communication hole 48, and the rotor core 24 is cooled. According to the present embodiment, the region between the second magnet holes 24*p* of the rotor core 24 can be suppressed from having high temperature, and the heat generation of the rotor core 24 can be suppressed from affecting the magnetic path in the rotor core 24.

In the present embodiment, one magnetic pole 20P includes three magnets 25. The three magnets 25 constituting the magnetic pole 20P are disposed in the three magnet holes 24*h* of the hole group G disposed in a substantially triangular shape as viewed from the axial direction. However, the number of magnets constituting one magnetic pole is not limited to that of the present embodiment, and may be, for example, two or four or more. As an example, one magnetic pole may include only the above-described two second magnets 25*p* and needs not include the first magnet 25*q*. As another example, one magnetic pole may have four second magnets 25*p*, and two pairs of second magnets 25*p* may be disposed to radially overlap each other as viewed from the axial direction.

As illustrated in FIG. 4, four lightening recess portions 40*j* of the present embodiment are provided in the fan 4. The plurality of lightening recess portions 40*j* are disposed along the circumferential direction. In the present embodiment, the plurality of lightening recess portions 40*j* are disposed at equal intervals along the circumferential direction. The lightening recess portion 40*j* is positioned radially outside the opening of the through hole 42 in the first surface 40*a*. The lightening recess portion 40*j* extends in a substantially arc shape about the center axis J. As illustrated in FIG. 5, the lightening recess portion 40*j* overlaps the rib 49 described later as viewed from the axial direction. That is, the lightening recess portion 40*j* is molded so as to hollow the inside of the rib 49 on the back surface side of the rib 49.

The fan 4 of the present embodiment is a die-cast component. For this reason, there is a possibility that a casting cavity occurs in a local thick part of the fan 4. According to the fan 4 of the present embodiment, since the back surface side of the rib 49 is provided with the lightening recess portion 40*j*, the body portion 40 can be suppressed from being provided with a local thick part. This can suppress a casting cavity from occurring inside the body portion 40, and can manufacture the fan 4 with high accuracy. In addition, according to the present embodiment, it is possible to reduce the weight of the fan 4 by providing the body portion 40 with the lightening recess portion 40*j*.

The rib 49 protrudes from the second surface 40*b* of the body portion 40 to the axial one side (+Y side). The rib 49 extends circumferentially about the center axis J. The rib 49 has a substantially annular shape about the center axis J. The rib 49 is disposed along the radially outer edge portion of the opening of the through hole 42 on the second surface 40*b* side. The rib 49 can guide the flow of air sucked from the opening of the through hole 42. By providing the rib 49, it is possible to sufficiently secure a distance between the opening on the axial one side (+Y side) of the inflow path 45 and the opening portion 43*c* of the outflow path 46. This can suppress the air flowed out from the opening portion 43*c* of the outflow path 46 from directly flowing into the inflow path 45.

The rib 49 can be used, for example, as a cutting allowance used for balance adjustment of the fan 4. That is, when imbalance occurs in the assembled rotor 20, the balance of the rotor 20 can be corrected by cutting a circumferential part of the rib 49. Cutting methods of the rib 49 include, for example, a method of performing drilling on a surface facing radially outward of the rib 49, but the method is not particularly limited.

According to the rotor 20 of the present embodiment, the fan 4 is disposed on each of the both end surfaces 24*f* of the rotor core 24. According to the present embodiment, the inflow path 45 and the outflow path 46 of each fan 4 can be disposed at both axial end portions of the vent holes 24*a* and 24*b*, and the air flowing in the rotor 20 can be smoothly flowed toward the coil end 31*a*. According to the present embodiment, since the fans 4 disposed at both ends of the rotor 20 have the same shape, it is no longer necessary to separately manufacture the fans 4 having different shapes, and thus it is possible to reduce the number of types of components used for the rotor 20. The fan 4 may be disposed to face at least one end surface 24*f* on the axial one side or the axial other side of the rotor core 24. When the fan 4 is provided on the end surface 24*f* on the axial one side of the rotor 20, a fan having another configuration may be disposed on the other end surface 24*f* on which the fan 4 is not disposed, or the fan needs not be disposed.

Next, a fan of modifications that can be employed in the above-described embodiment will be described. In the description of each modification described below, the same reference signs are given to the same components having the same aspects as those of the embodiment or modification described already, and the description thereof will be omitted.

Figure 7:
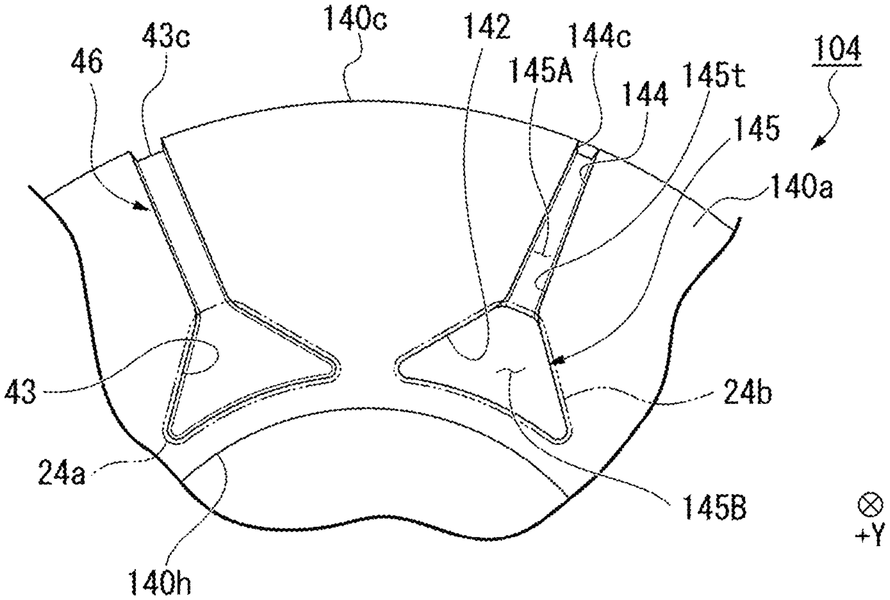
FIG. 7 is a rear view of a fan of modification 1.
Figure 8:
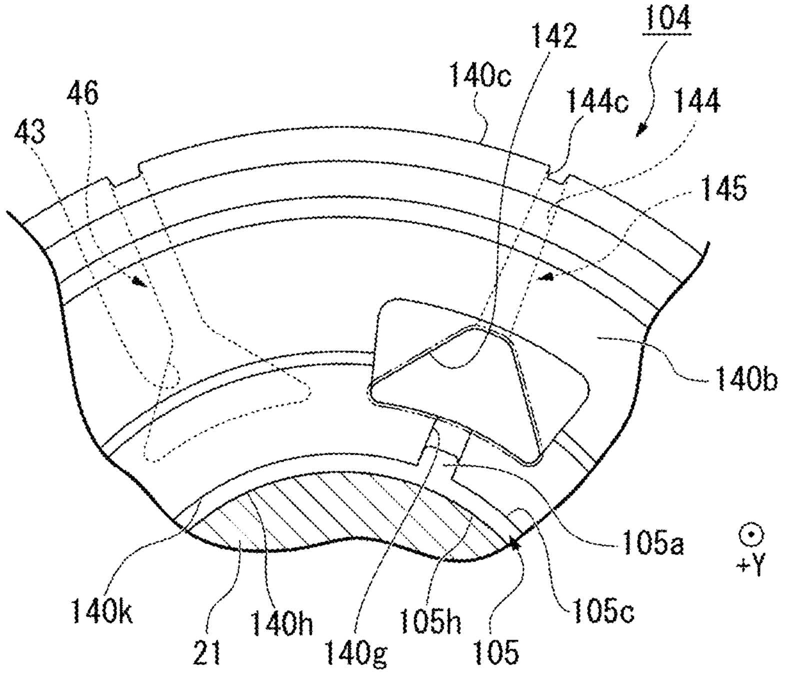
FIG. 8 is a front view of the fan of modification 1.

FIG. 7 is a rear view of a fan 104 of modification 1. FIG. 8 is a front view of the fan 104 of modification 1. FIG. 8 illustrates the shaft 21 and a fixing member 105 together with the fan 104.

As illustrated in FIG. 7, the fan 104 is provided with an inflow path 145 and an outflow path 46. The fan 104 includes a second shaft insertion hole 140*h*, a plurality of through holes 142, the plurality of first recess portions 43, and a plurality of second recess portions 144. The second recess portions 144 are provided on a first surface 140*a* and recessed to the axial one side (+Y side). As many the second recess portions 144 as the through holes 142 are provided. Note that the first recess portion 43 of the present modification has the same configuration as the first recess portion 43 of the above-described embodiment. Similarly to the above-described embodiment, the first surface 140*a* of the fan 104 is a surface facing the end surface 24*f* (see FIG. 1) of the rotor core 24, and a second surface 140*b* is a surface positioned on the opposite side of the first surface 140*a*.

Similarly to the above-described embodiment, the outflow path 46 of the present modification includes a space surrounded by the end surface 24*f* of the rotor core 24 and the first recess portion 43. Therefore, when the rotor 20 rotates, the air reached the outflow path 46 from the first vent hole 24*a* flows radially outward and is blown out radially outward from the opening portion 43*c*. On the other hand, the inflow path 145 of the present modification includes a space surrounded by the end surface 24*f* of the rotor core 24 and the second recess portion 144, and the through holes 142.

The through holes 142 axially penetrate the fan 104. The shape of the opening in the first surface 140*a* of the through hole 142 is a shape protruding in at least one direction. In the present modification, the shape of the opening in the first surface 140*a* of the through hole 142 is a substantially triangular shape with rounded corners protruding radially outward. The opening on the first surface 140*a* of the through hole 142 axially overlaps the second vent hole 24*b*.

The second recess portion 144 is connected to the through hole 142. The second recess portion 144 of the present modification has a groove shape. The second recess portion 144 of the present modification linearly extends radially outward from the radially outer end portion of the through hole 142. In the present modification, the width dimension (circumferential dimension) of the second recess portion 144 continuously narrows toward the radial outside. The second recess portion 144 include a second opening portion 144*c* opening to the outer surface 140*c* of the fan 104.

In the inflow path 145, a region provided in a space surrounded by the end surface 24*f* and the second recess portion 144 is called a first flow path region 145A, and a region provided inside the through hole 142 is called a second flow path region 145B. The inflow path 145 merges the air flowing in from the opening of each of the first flow path region 145A and the second flow path region 145B and guides the merged air to the second vent hole 24*b*.

According to the present modification, the inflow path 145 includes the first flow path region 145A inside the second recess portion 144 in addition to the second flow path region 145B inside the through hole 142. Therefore, the inflow path 145 can allow air to flow into the inflow path 145 not only through the opening of the through hole 142 facing the axial direction but also through the second opening portion 144*c* facing the radial direction. This enables the inflow path 145 to take in more air from the outside, and guide more air to the second vent hole 24*b*.

The first flow path region 145A of the present modification branches from the second flow path region 145B and extends radially. As in the present modification, when the inflow path 145 has a plurality of flow path regions branching from each other, the total flow path cross-sectional area increases even if the inflow cross-sectional area of each flow path region is small. Thus, when the plurality of flow path regions is provided, the minimum flow path cross-sectional area of the inflow path 145 is the sum of the minimum flow path cross-sectional areas of the respective flow path regions. Also in the present modification, similarly to the above-described embodiment, the flow path cross-sectional area of the outflow path 46 in the opening portion 43*c* is smaller than the minimum flow path cross-sectional area of the inflow path 145.

As described above, the width dimension of the second recess portion 144 of the present modification continuously decreases toward the radial outside. Therefore, in the inflow path 145, the flow path cross-sectional area gradually decreases in the region provided in the second recess portion 144. A region provided in the second recess portion 144 of the inflow path 145 is called a narrow portion (second narrow portion) 145*t*. That is, the inflow path 145 includes the second narrow portion 145*t* in which the flow path cross-sectional area decreases toward the radial outside. According to the present modification, the inflow path 145 easily guides the air radially inward at the second narrow portion 145*t*. According to the present modification, more air can be guided to the second vent hole 24*b* via the first flow path region 145A.

As illustrated in FIG. 8, the fixing member 105 is disposed on the axial one side (+Y side) of the fan 104. The fixing member 105 axially faces the fan 104. The fixing member 105 includes a first shaft insertion hole 105*h* into which the shaft 21 is inserted. Similarly to the fixing member 5 in the above-described embodiment, the fixing member 105 is press-fitted and fixed to an outer surface 105*c* of the shaft 21. By sandwiching the fan 104 between the fixing member 105 and the rotor core 24 (see FIG. 1), the fixing member 105 can suppress the fan 104 from separating from the shaft 21 in the axial direction. The outer surface 105*c* of the fixing member 105 is provided with a plurality of first protrusion portions 105*a* protruding radially outward. The outer surface 105*c* of the fixing member 105 of the present modification is provided with two first protrusion portions 105*a* protruding radially outward. The two first protrusion portions 105*a* are disposed on the opposite side (i.e., symmetry) with respect to the center axis J.

The second surface 140*b* of the fan 104 is provided with a recess portion 140*k* recessed to the axial other side (−Y side) and a plurality of recess grooves 140*g* continuous with the recess portion 140*k*. In the present modification, two recess grooves 140*g* are provided. The recess portion 140*k* has a substantially circular shape about the center axis J as viewed from the axial direction. The second shaft insertion hole 140*h* into which the shaft 21 is inserted opens in the bottom surface of the recess portion 140*k*. The fixing member 105 is disposed inside the recess portion 140*k*. The inner surface of the recess portion 140*k* radially faces the outer surface 105*c* of the fixing member 105.

The recess groove 140*g* is recessed from the second surface 140*b* to the axial other side (−Y side). The recess groove 140*g* extends radially. The two recess grooves 140*g* are disposed on the opposite side (i.e., symmetry) with respect to the center axis J. The first protrusion portion 105*a* of the fixing member 105 is disposed in each of the recess grooves 140*g*. Since the surface facing the circumferential direction of the protrusion portion 105*a* circumferentially faces the inner surface of the recess groove 140*g*, circumferential relative movement of the fan 104 with respect to the fixing member 105 can be restricted. As a result, the fixing member 105 can suppress relative rotation between the fan 104 and the shaft 21.

The recess groove 140*g* of the present modification is disposed radially inside the through hole 142. The radially outer end portion of the recess groove 140*g* of the present modification is connected to the through hole 142. According to the present modification, even when the radial dimension of the first protrusion portion 105*a* is larger than the radial dimension of the recess groove 140*g*, the fixing member 105 can be assembled to the fan 104 by disposing the tip end of the first protrusion portion 105*a* in the through hole 142. That is, according to the present modification, it is possible to allow variations in the radial length dimension of the first protrusion portion 105*a*, and it is possible to manufacture the fixing member 105 at low cost.

In the present modification, the through hole 142 to which the recess groove 140*g* is connected constitutes a part of the inflow path 145. However, the through hole to which the recess groove 140*g* is connected may constitute a part of the outflow path 46. That is, the through hole to which the recess groove 140*g* is connected may penetrate in the axial direction and may constitute at least a part of either the inflow path or the outflow path. Note that examples in which a part of the outflow path is configured by a through hole include the fan 204 (see FIG. 9) of modification 2 described later.

Figure 9:
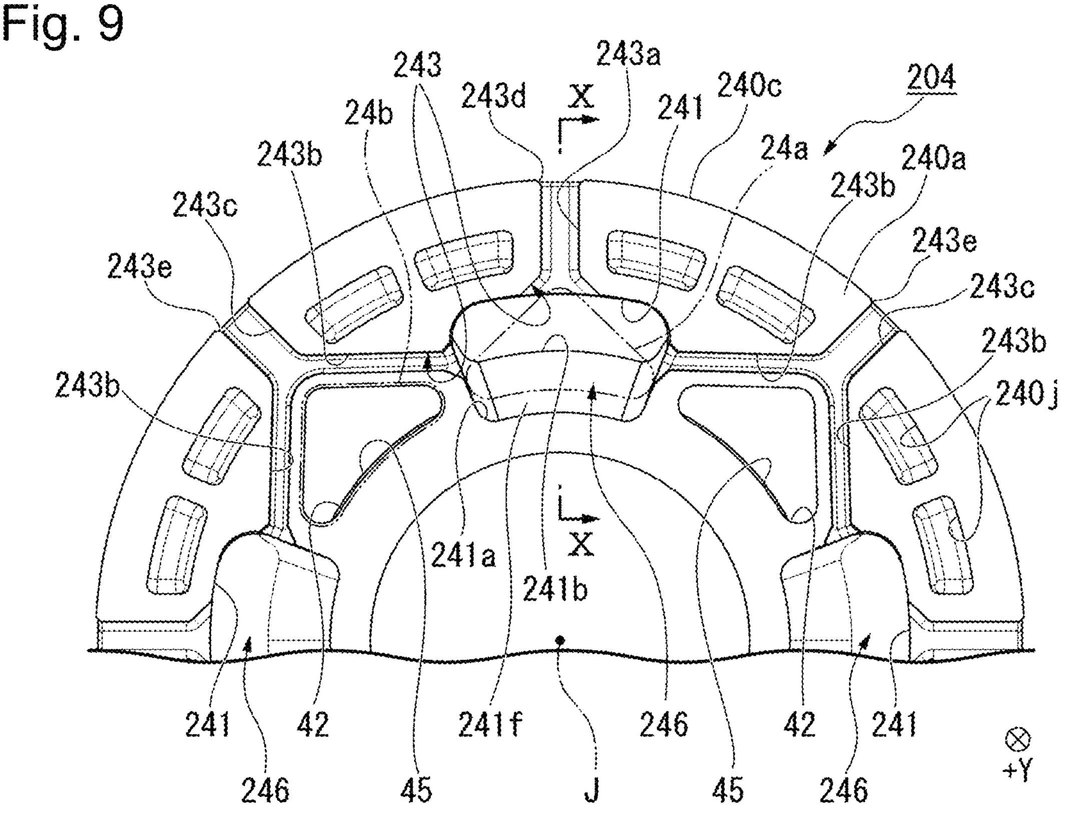
FIG. 9 is a rear view of a fan of modification 2.
Figure 10:
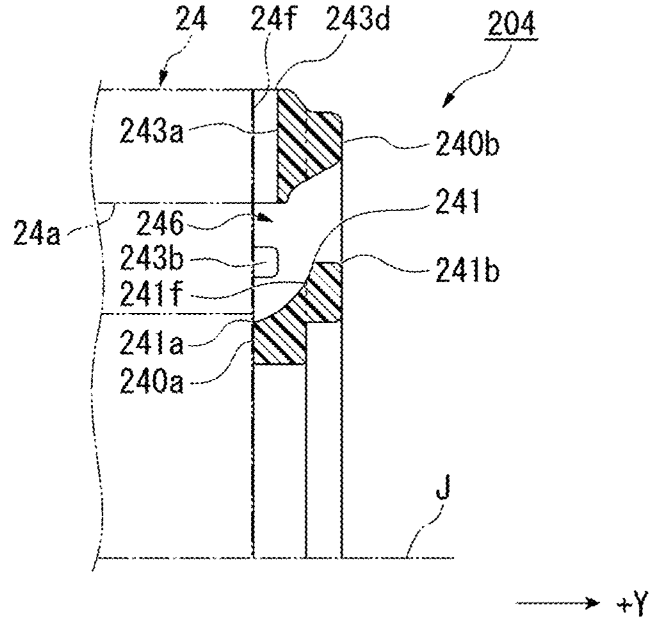
FIG. 10 is a cross-sectional view of the fan taken along line X-X of FIG. 9.

FIG. 9 is a rear view of the fan 204 of modification 2. FIG. 10 is a cross-sectional view of the fan 204 taken along line X-X of FIG. 9.

As illustrated in FIG. 9, the fan 204 is provided with the inflow path 45 and an outflow path 246. The fan 204 includes a plurality of first through holes 241, a plurality of second through holes 42, a plurality of recess portions (first recess portions) 243, and a plurality of lightening recess portions 240*j*. The second through hole 42 of the present modification has the same configuration as the second through hole 42 of the above-described embodiment. The plurality of lightening recess portions 240*j* are provided on a first surface 240*a* and arranged side by side along the circumferential direction.

Similarly to the above-described embodiment, the first surface 240*a* of the fan 204 is a surface facing the end surface 24*f* (see FIG. 1) of the rotor core 24, and a second surface 240*b* is a surface positioned on the opposite side of the first surface 240*a* in the axial direction.

The inflow path 45 of the present modification includes the second through hole 42 similarly to the above-described embodiment. On the other hand, the outflow path 246 of the present modification includes a space surrounded by the end surface 24*f* (see FIG. 1) of the rotor core 24 and the first recess portion 243, and the first through hole 241.

The first through hole 241 axially penetrates the fan 204. The plurality of first through holes 241 are disposed along the circumferential direction. The plurality of first through holes 241 of the present modification are disposed at equal intervals along the circumferential direction. The first through hole 241 is disposed between the second through holes 42 circumferentially adjacent to each other. The opening shape on the first surface 240*a* of the first through hole 241 of the present modification is substantially rectangular. The opening on the first surface 240*a* of the first through hole 241 overlaps the first vent hole 24*a* as viewed from the axial direction. Due to this, the first through hole 241 communicates with the first vent hole 24*a*.

As illustrated in FIG. 10, the first through hole 241 includes a first opening 241*a* opening to the first surface 240*a* of the fan 204 and a second opening 241*b* opening to the second surface 240*b*. The first through hole 241 of the present modification extends slantingly radially outward from the first opening 241*a* toward the second opening 241*b* side. The inner surface of the first through hole 241 includes a guide surface 241*f* facing the axial other side (−Y side) and the radial outside. The guide surface 241*f* slants in an orientation positioned radially outward toward the axial one side (+Y side). The guide surface 241*f* axially faces the opening of the first vent hole 24*a* of the rotor core 24. The guide surface 241*f* includes at least one of a flat surface and a curved surface.

As described above, the first through hole 241 constitutes a part of the outflow path 246. Therefore, when the rotor 20 rotates, air flows into the first through hole 241 from the first vent hole 24*a*. At this time, the guide surface 241*f* guides radially outward the air flowing into the first through hole 241. This enables the guide surface 241*f* to direct radially outward the blowing direction of the air blown out from the first opening 241*a*. This can cool the coil end 31*a* by bringing the air blown out from the first through hole 241 into contact with the coil end 31*a* positioned radially outside the fan 204.

The plurality of first recess portions 243 include a first groove portion 243*a*, a second groove portion 243*b*, and a third groove portion 243*c*. The first groove portion 243*a* is disposed radially outside the first through hole 241. The first groove portion 243*a* extends along the radial direction. The radially inner end portion of the first groove portion 243*a* is connected to the first through hole 241. The radially outer end portion of the first groove portion 243*a* constitutes an opening portion (first opening portion) 243*d* opening to the outer surface 240*c*. The second groove portion 243*b* is disposed on each of the circumferential one side and other side of the first through hole 241. The second groove portion 243*b* is connected to the end portion on circumferential one side and other side of the first through hole 241. The second groove portion 243*b* linearly extends in a direction toward the radially outer side with circumferential distance from the first through hole 241. A part of the second groove portion 243*b* is disposed radially outside the second through hole 42.

The two second groove portions 243*b* extending from the first through holes 241 circumferentially adjacent to each other are connected to each other at the radially outer end portion of the first surface 240*a*. The third groove portion 243*c* is disposed radially outside the second through hole 42. The third groove portion 243*c* extends radially. The radially inner end portion of the third groove portion 243*c* is connected to the two second groove portions 243*b*. The radially outer end portion of the third groove portion 243*c* constitutes an opening portion (first opening portion) 243*e* opening to the outer surface 240*c*. That is, the third groove portion 243*c* radially extends from the radially outer end portion of the second groove portion 243*b* toward the outer surface 240*c*.

According to the present modification, the first through hole 241 is connected to the first recess portion 243 and constitutes at least a part of the outflow path 246. According to the present modification, air can be blown toward the coil end 31*a* not only in the first recess portion 243 but also in the first through hole 241, and the coil end 31*a* can be further cooled. According to the present modification, the first recess portion 243 includes the plurality of first opening portions 243*d* and 243*e* opening in the outer surface 240*c*. Therefore, according to the fan 204 of the present modification, it is possible to increase the number of the opening portions 243*d* and 243*e* through which air is blown out radially outward from the outer surface 240*c*, it is possible to blow more air from the fan 4 and hit the coil end 31*a* positioned radially outward of the fan 204, and thus it is possible to efficiently cool the coil end 31*a*.

Figure 11:
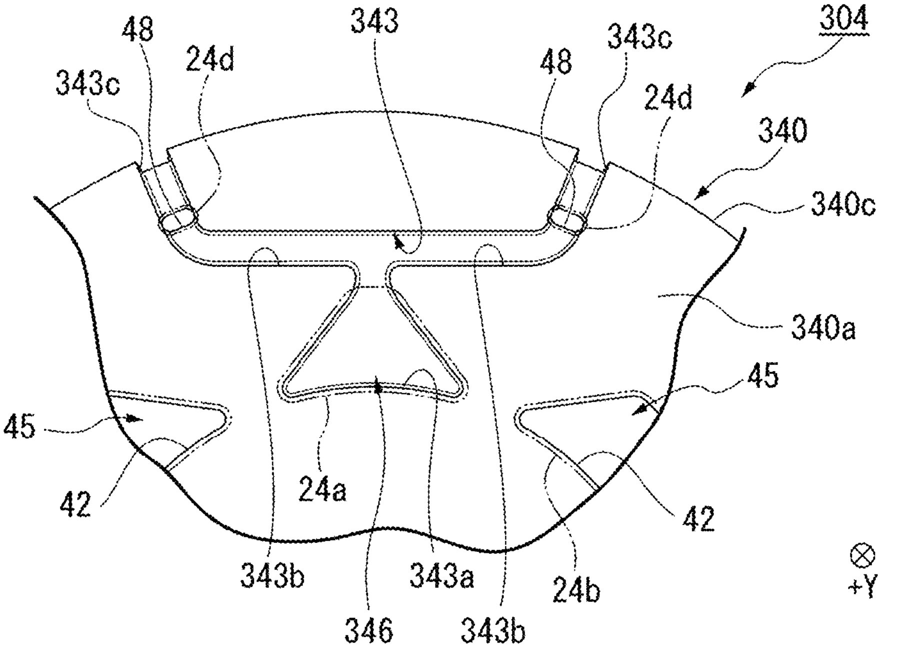
FIG. 11 is a rear view of a fan of modification 3.

FIG. 11 is a rear view of a fan 304 of modification 3. The fan 304 of the present modification is different from the above-described embodiment mainly in that a recess portion (first recess portion) 343 includes a plurality of groove portions 343*b*.

The fan 304 is provided with the inflow path 45 and an outflow path 346. The fan 304 includes the through hole 42 and the first communication hole 48 penetrating in the axial direction, and the first recess portion 343 provided in a first surface 340*a*. The inflow path 45 includes the through hole 42. The outflow path 346 is formed in a space surrounded by the end surface 24*f* (see FIG. 1) of the rotor core 24 and the first recess portion 343. Note that the first surface 340*a* of the fan 304 is a surface facing the end surface 24*f* (see FIG. 1) of the rotor core 24, similarly to the above-described embodiment.

The first recess portion 343 includes a connection portion 343*a* overlapping the first vent hole 24*a* as viewed from the axial direction, a pair of groove portions 343*b* connected to the connection portion 343*a*, and a pair of opening portions 343*c* opening in the outer surface 340*c*. The connection portion 343*a* has a shape protruding in at least one direction as viewed from the axial direction. The connection portion 343*a* of the present modification has a substantially triangular shape with rounded corners protruding radially outward as viewed from the axial direction. In the present modification, the shape of the connection portion 343*a* viewed from the axial direction is substantially the same as the shape of the opening in the end surfaces 24*f* of the vent holes 24*a* and 24*b*. Each of the pair of groove portions 343*b* is connected to the radially outer end portion of the connection portion 343*a*. Each of the pair of groove portions 343*b* extends from the radially outer end portion of the connection portion 343*a* toward the opposite side in the circumferential direction, is bent radially outward in a radially outer region of the through hole 42, and opens to the outer surface 340*c*. The radially outer end portion of the groove portion 343*b* constitutes the opening portion 343*c*. As long as the connection portion 343*a* communicates with the vent holes 24*a* and 24*b*, the shape of the connection portion 343*a* viewed from the axial direction may be different from the shape of the opening in the end surface 24*f* of the vent holes 24*a* and 24*b*.

According to the present modification, the first recess portion 343 includes the plurality of opening portions 343*c*. According to the fan 304 of the present modification, it is possible to increase the number of the opening portions 343*c* through which air is blown out radially outward from the outer surface 340*c*, it is possible to blow more air from the fan 4 and hit the coil end 31*a* positioned radially outward of the fan 304 when the rotor 20 rotates, and thus it is possible to efficiently cool the coil end 31*a*.

Similarly to the above-described embodiment, the first communication hole 48 overlaps the second communication hole 24*d* of the rotor core 24 as viewed from the axial direction. The first communication hole 48 of the present modification opens in the bottom surface of the groove portion 343*b*. Therefore, the first communication hole 48 and the second communication hole 24*d* are connected to each other via the first recess portion 343. According to the present modification, air is guided into the second communication hole 24*d* not only from the first communication hole 48 but also from the first recess portion 343. Therefore, more air is introduced into the second communication hole 24*d*, and the rotor core 24 can be further cooled.

Figure 12:
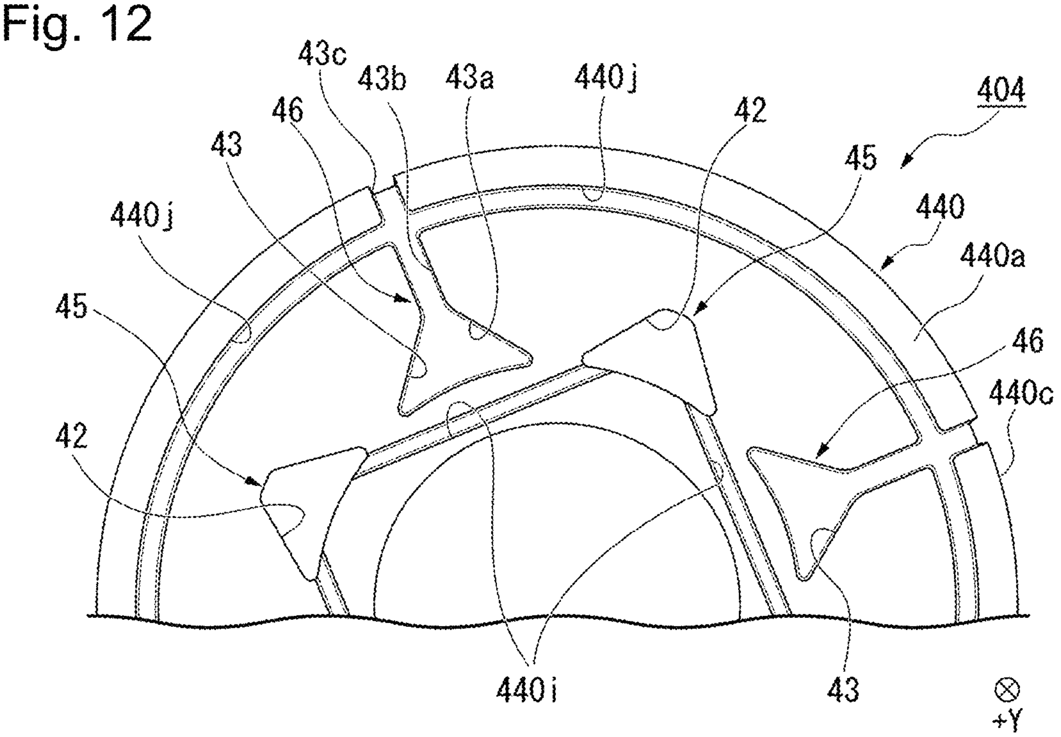
FIG. 12 is a rear view of a fan of modification 4.

FIG. 12 is a rear view of a fan 404 of modification 4. The fan 404 of the present modification is different from the above-described embodiment mainly in that a first surface 440*a* is provided with a third recess portion 440*i* and a fourth recess portion 440*j*.

The fan 404 is provided with a plurality of the inflow paths 45 and a plurality of the outflow paths 46. Fan 404 includes the through hole 42, the first recess portion 43, the third recess portion 440*i*, and the fourth recess portion 440*j*. The first recess portion 43, the third recess portion 440*i*, and the fourth recess portion 440*j* are provided on the first surface 440*a* and are recessed to the axial one side (+Y side). The inflow path 45 includes the through hole 42. The outflow path 46 is formed in a space surrounded by the end surface 24*f* (see FIG. 1) of the rotor core 24 and the first recess portion 43. Note that the first surface 440*a* of the fan 404 is a surface facing the end surface 24*f* (see FIG. 1) of the rotor core 24, similarly to the above-described embodiment.

The third recess portion 440*i* of the present modification has a groove shape. The third recess portion 440*i* extends linearly toward the circumferential direction. The third recess portion 440*i* is positioned radially inside the first recess portion 43. The third recess portion 440*i* connects the through holes 42 circumferentially adjacent to each other. That is, the third recess portion 440*i* connects the plurality of inflow paths 45 to each other. According to the present modification, when the flow rate of the air flowing through the inflow paths 45 circumferentially adjacent to each other is non-uniform, the air can flow from the inflow path 45 having a large flow rate toward the inflow path 45 having a small flow rate via the third recess portion 440*i*. This can suppress the flow rate of the air flowing through the plurality of inflow paths 45 from becoming non-uniform, and can guide more air to the inside of the rotor core 24.

Similarly to the above-described embodiment, the first recess portion 43 includes the connection portion 43*a*, the groove portion 43*b* connected to the connection portion 43*a*, and the opening portion 43*c* opening to an outer surface 440*c*. The fourth recess portion 440*j* of the present modication has a groove shape. The fourth recess portion 440*j* extends in a substantially annular shape about the center axis J. The fourth recess portion 440*j* is positioned radially outside the through hole 42 and the connection portion 43*a*. The fourth recess portion 440*j* connects the groove portions 43*b* circumferentially adjacent to each other. That is, the fourth recess portion 440*j* connects the first recess portions 43 to each other. The fourth recess portion 440*j* connects the plurality of outflow paths 46 to each other. According to the present modification, when the flow rate of the air flowing through the outflow paths 46 circumferentially adjacent to each other is non-uniform, the air can flow from the outflow path 46 having a large flow rate toward the outflow path 46 having a small flow rate via the fourth recess portion 440*j*. This can suppress the flow rate of the air flowing through the plurality of outflow paths 46 from becoming non-uniform, and can send more air radially outward.

Figure 13:
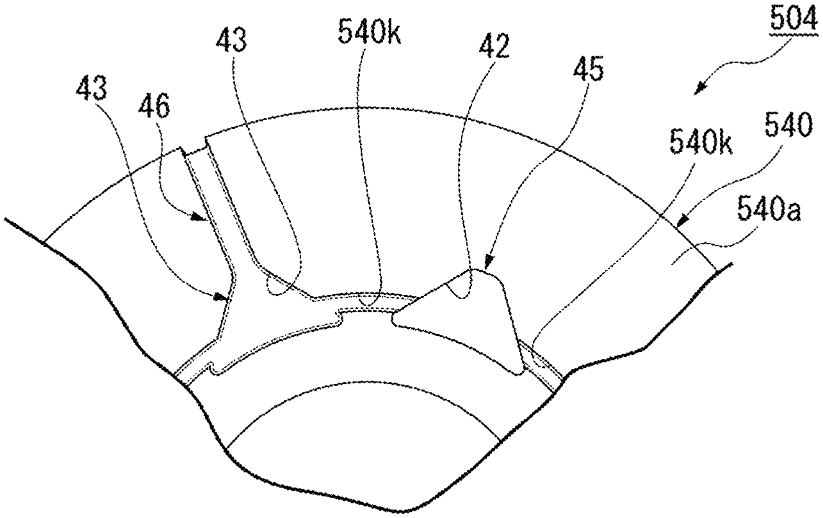
FIG. 13 is a rear view of a fan of modification 5.

FIG. 13 is a rear view of a fan 504 of modification 5. The fan 504 of the present modification is different from the above-described embodiment mainly in that a first surface 540*a* is provided with a fifth recess portion 540*k*.

The fan 504 is provided with a plurality of the inflow paths 45 and a plurality of the outflow paths 46. The fan 504 includes the second through hole 42, the first recess portion 43, and the fifth recess portion 540*k*. The first recess portion 43 and the fifth recess portion 540*k* are provided on the first surface 540*a* and are recessed to the axial one side (+Y side). The inflow path 45 includes the second through hole 42. The outflow path 46 is formed in a space surrounded by the end surface 24*f* (see FIG. 1) of the rotor core 24 and the first recess portion 43. Note that the first surface 540*a* of the fan 504 is a surface facing the end surface 24*f* (see FIG. 1) of the rotor core 24, similarly to the above-described embodiment.

The fifth recess portion 540*k* of the present modification has a groove shape. The fifth recess portion 540*k* extends in a substantially arc shape along the circumferential direction. The fifth recess portion 540*k* connects the first recess portion 43 and the second through hole 42 circumferentially adjacent to each other. That is, the fifth recess portion 540*k* connects the inflow path 45 and the outflow path 46. According to the present modification, the air can be more efficiently sent radially outward from the outflow path 46.

Figure 14:
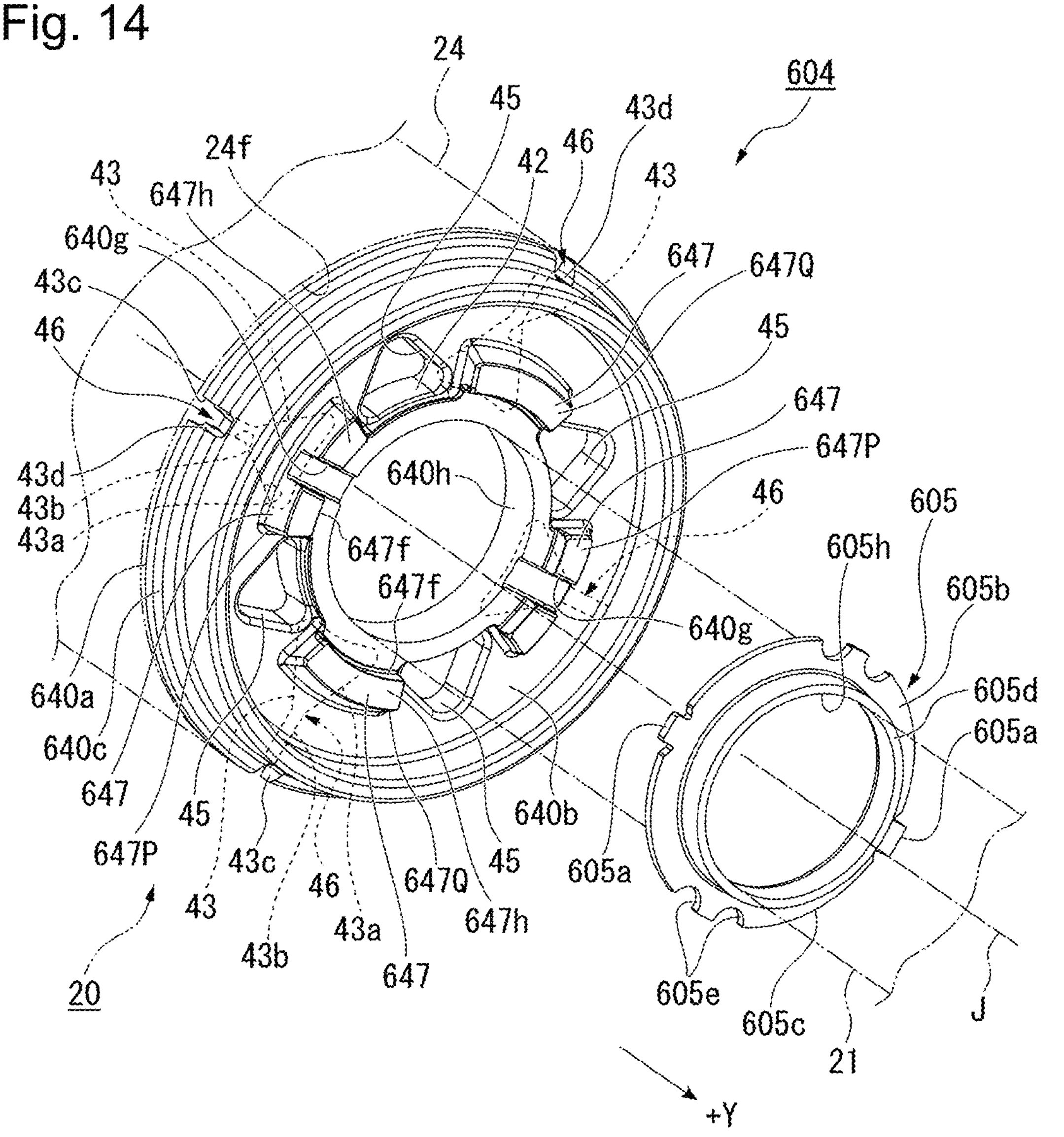
FIG. 14 is a perspective view of a fan and a fixing member of modification 6.
Figure 15:
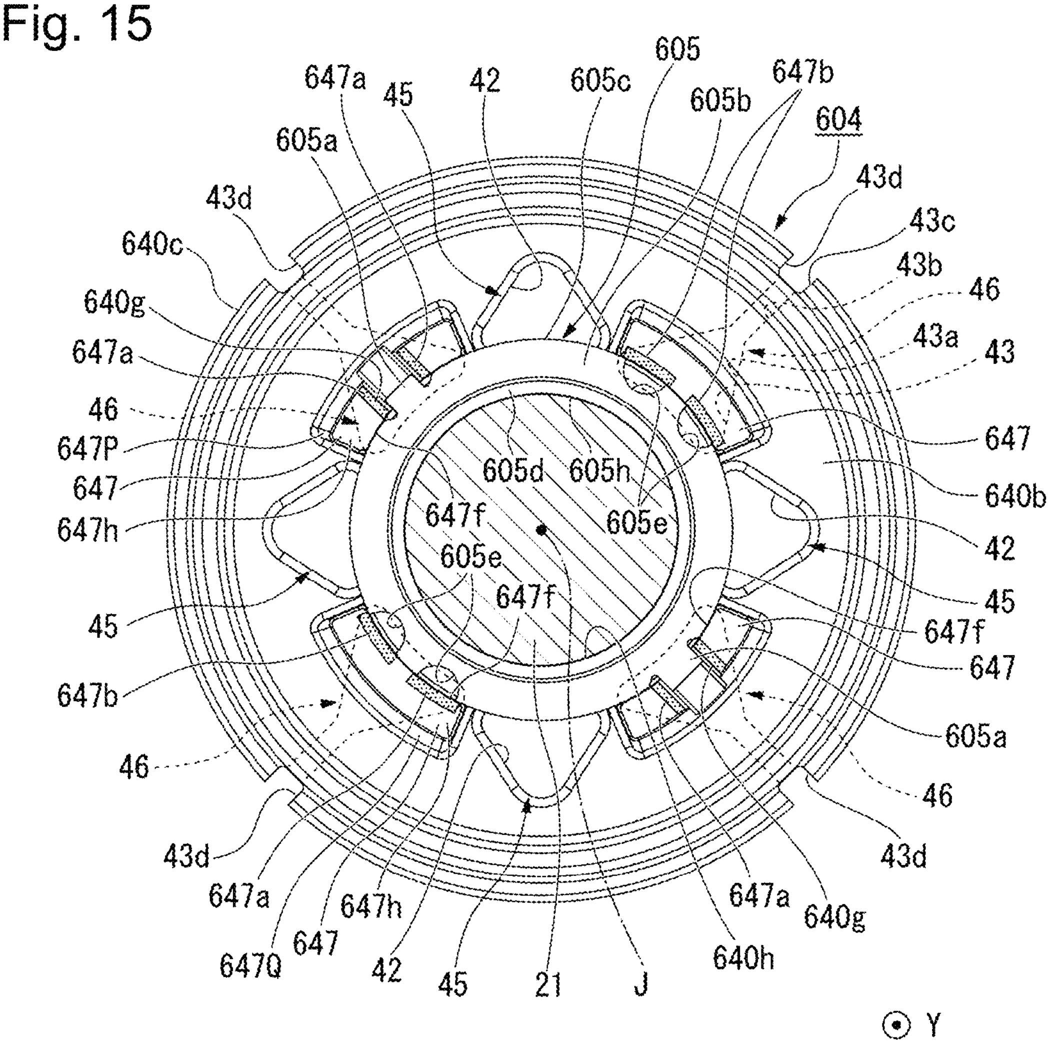
FIG. 15 is a front view of the fan and the fixing member of modification 6.

FIG. 14 is an exploded perspective view of a fan 604 and a fixing member 605 of modification 6. FIG. 15 is a front view of the fan 604 and the fixing member 605 of modification 6.

As illustrated in FIG. 14, the fan 604 is provided with the inflow path 45 and the outflow path 46. The fan 604 includes a first surface 640*a*, a second surface 640*b*, an outer surface 640*c*, a second shaft insertion hole 640*h*, a plurality of the through holes 42, a plurality of the first recess portions 43, and a plurality of recess grooves 640*g*. Similarly to the above-described embodiment, the first surface 640*a* is a surface facing the end surface 24*f* of the rotor core 24. The second surface 640*b* is a surface positioned on the opposite side of the first surface 640*a* in the axial direction. The outer surface 640*c* is a surface facing radially outward.

The second shaft insertion hole 640*h* axially penetrates the fan 604. The second shaft insertion hole 640*h* has a circular shape about the center axis J as viewed from the axial direction. The shaft 21 is inserted into the second shaft insertion hole 640*h*. The inner diameter of the second shaft insertion hole 640*h* is larger than the outer diameter of the shaft 21.

The plurality of through holes 42 axially penetrate the fan 604. The plurality of through holes 42 are arranged side by side at equal intervals in the circumferential direction. The first recess portion 43 is provided on the first surface 640*a*. The plurality of first recess portions 43 are arranged side by side in the circumferential direction. The first recess portion 43 includes the connection portion 43*a*, the groove portion 43*b* extending radially outward from the connection portion 43*a*, and the opening portion 43*c* positioned at a radially outer end portion of the groove portion 43*b*. As viewed from the axial direction, the first recess portion 43 is positioned between the through holes 42 arranged side by side in the circumferential direction. Similarly to the above-described embodiment, the through hole 42 constitutes the inflow path 45. A space surrounded by the first recess portion 43 and the end surface 24*f* of the rotor core 24 constitutes the outflow path 46.

The opening portion 43*c* of the first recess portion 43 is recessed radially inward on the outer surface 640*c* to constitute a cutout portion 43*d*. That is, the outer surface 640*c* is provided with a plurality of the cutout portions 43*d*. The plurality of cutout portions 43*d* are arranged at equal intervals along the circumferential direction. A worker who performs an assembling operation of the rotor 20, an assembling device, and the like (hereinafter, worker or the like) hold the fan 604 by inserting the tip end portion of a jig into four cutout portions 43*d*. Furthermore, by rotating the jig about the center axis J, the worker or the like positions the fan 604 in the circumferential direction with respect to the shaft 21.

The second surface 640*b* of the fan 604 is provided with a plurality of (four in the present modification) protrusion shape portions 647. The protrusion shape portion 647 is a part of the second surface 640*b*, and is a part axially protruding in the second surface 640*b*. The plurality of protrusion shape portions 647 are arranged side by side at equal intervals in the circumferential direction. The protrusion shape portion 647 is positioned between the through holes 42 circumferentially adjacent to each other. The protrusion shape portion 647 overlaps the first recess portion 43 as viewed from the axial direction. The protrusion shape portion 647 includes an inner surface 647*f* facing the radial inside. The inner surface 647*f* is a surface having an arc shape about the center axis J as viewed from the axial direction.

The protrusion shape portion 647 includes a tip end surface 647*h* facing the axial one side. The tip end surface 647*h* is a part of the second surface 640*b*. The tip end surface 647*h* is provided with the recess groove 640*g*. That is, the second surface 640*b* is provided with the recess groove 640*g*. The recess groove 640*g* is recessed from the second surface 640*b* to the axial other side (−Y side). In the present modification, the recess grooves 640*g* are provided in the two protrusion shape portions 647 positioned on the opposite side across the center axis J of the four protrusion shape portions 647. Therefore, the fan 604 of the present modification is provided with two recess grooves 640*g*. In the description below, of the four protrusion shape portions 647, the two provided with the recess groove 640*g* are called first protrusion shape portions 647P, and the two not provided with the recess groove 640*g* are called second protrusion shape portions 6470. The first protrusion shape portions 647P and the second protrusion shape portions 647Q are alternately arranged side by side in the circumferential direction.

The first protrusion shape portion 647P is positioned between the plurality of through holes 42 and overlaps the first recess portion 43 as viewed from the axial direction. Therefore, the recess groove 640*g* is positioned between the plurality of through holes 42 and overlaps the first recess portion 43 as viewed from the axial direction. The recess groove 640*g* extends radially and opens on radially both sides. The two recess grooves 640*g* are disposed on the opposite side (i.e., symmetry) with respect to the center axis J. The two recess grooves 640*g* are arranged side by side on the same straight line as viewed from the axial direction. As described above, the fan 604 can be formed by other methods such as aluminum die casting, cutting, or pressing. The two recess grooves 640*g* in the present modification can be formed, for example, in accordance with molding of the fan 604 by die casting, or can also be formed by cutting. When formed by cutting, for example, the recess groove 640*g* can be formed in one cutting process by moving a device such as an end mill on a straight line. After the fan 604 is formed by die casting, the above machining may be additionally performed. This can increase the dimensional accuracy of the recess groove 640*g*.

The rotor 20 includes the fixing member 605 that fixes the fan 604 to the shaft 21. The fixing member 605 is disposed on the axial one side (+Y side) of the fan 604. The fixing member 605 axially faces the fan 604.

The fixing member 605 includes a tubular portion 605*d* into which the shaft 21 is press-fitted, and a flange portion 605*b* protruding radially outward from the tubular portion 605*d*. The inner peripheral surface of the tubular portion 605*d* constitutes a first shaft insertion hole 605*h*. That is, the fixing member 605 includes the first shaft insertion hole 605*h* into which the shaft 21 is inserted.

When the shaft 21 is press-fitted into the tubular portion 605*d*, the fixing member 605 is fixed to the outer surface of the shaft 21. The flange portion 605*b* is disposed radially inside the plurality of protrusion shape portions 647. An outer surface 605*c* of the flange portion 605*b* is fitted to the inner surfaces 647*f* of the plurality of protrusion shape portions 647. Due to this, the fan 604 is radially positioned with respect to the flange portion 605*b*. The flange portion 605*b* is in contact with the second surface 640*b* of the fan 604 from the axial one side (+Y side). Due to this, the fan 604 is sandwiched between the rotor core 24 and the flange portion 605*b* and fixed to the shaft 21.

The outer surface 605*c* of the fixing member 605 of the present modification is provided with a plurality of (two in the present modification) first protrusion portions 605*a* protruding radially outward and a plurality of (four in the present modification) recess shape portions 605*e* recessed radially inward. The two first protrusion portions 605*a* are disposed on the opposite side (i.e., symmetry) with respect to the center axis J. The four recess shape portions 605*e* are provided as two sets with two of them disposed in the vicinity as one set. The two sets of recess shape portions 605*e* are disposed on the opposite side (i.e., symmetry) with respect to the center axis J.

As illustrated in FIG. 15, the first protrusion portion 605*a* is disposed in the recess groove 640*g*. The surface facing the circumferential direction of the first protrusion portion 605*a* circumferentially faces the inner surface of the recess groove 640*g*. Due to this, the fixing member 605 restricts movement of the fan 604 in the circumferential direction with respect to the fixing member 605.

The recess groove 640*g* of the present modification passes between the through holes 42 circumferentially adjacent to each other. Therefore, as compared with a case where the recess groove 140*g* is positioned radially inside the through hole 142 (modification 1 illustrated in FIG. 8), the recess groove 640*g* does not restrict the size of the through hole 42, and the through hole 42 can be easily radially enlarged. This allows a large amount of air to pass through the through hole 42.

In the present modification, the through holes 42 disposed on circumferential both sides with respect to the recess groove 640*g* constitute a part of the inflow path 45. However, the through holes disposed on the circumferential both sides with respect to the recess groove 640*g* may constitute a part of the outflow path 46. That is, the through holes disposed on the circumferential both sides with respect to the recess groove 640*g* may penetrate in the axial direction and may constitute at least a part of either the inflow path or the outflow path.

In the present modification, the recess groove 640*g* opens on radially both sides. Therefore, even when the radial dimension of the first protrusion portion 605*a* is larger than the radial dimension of the recess groove 640*g*, the fixing member 605 can be assembled to the fan 604 by protruding the tip end of the first protrusion portion 605*a* radially outward from the radially outer end portion of the recess groove 640*g*. That is, according to the present modification, it is possible to sufficiently allow variations in the radial length dimension of the first protrusion portion 605*a*, and it is possible to manufacture the fixing member 605 at low cost.

As illustrated in FIG. 15, the first protrusion shape portion 647P includes a plurality of first crimped portions 647*a*. The first crimped portion 647*a* is provided on the tip end surface 647*h* of the first protrusion shape portion 647P. The first crimped portion 647*a* is positioned on circumferential both sides with respect to the recess groove 640*g*. The first crimped portion 647*a* is provided along the recess groove 640*g*. The first crimped portion 647*a* can be formed, for example, by applying pressure to the tip end surface 647*h* using a jig or the like and plastically deforming the tip end surface 647*h*.

Figure 16:
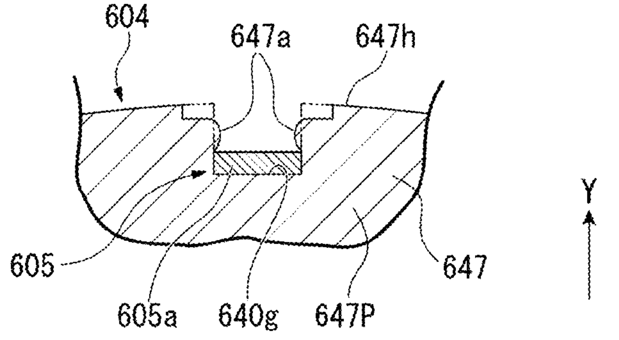
FIG. 16 is a schematic partial cross-sectional view of the fan and the fixing member of modification 6.

FIG. 16 is a schematic cross-sectional view of the fan 604 in the first crimped portion 647*a*.

By plastic deformation in the forming stage, the first crimped portion 647*a* is recessed on the axial other side (−Y side) and protrudes toward the inside of the recess groove 640*g*. The first crimped portion 647*a* is disposed on the axial one side (+Y side) of the first protrusion portion 605*a* in a part protruding into the recess groove 640*g*.

According to the fan 604 of the present modification, the end portion on the axial one side (+Y side) of the recess groove 640*g* is provided with the first crimped portion 647*a*. A part of the first crimped portion 647*a* protrudes into the recess groove 640*g* and axially faces the first protrusion portion 605*a*. This restricts the axial movement of the fan 604 with respect to the fixing member 605, and can suppress rattling of the fan 604 in the axial direction.

As illustrated in FIG. 15, the second protrusion shape portion 6470 includes a plurality of second crimped portions 647*b*. The second crimped portion 647*b* is positioned radially outside the recess shape portion 605*e* of the fixing member 605. The plurality of second crimped portions 647*b* are provided on the tip end surface 647*h* facing the axial direction of the second protrusion shape portion 6470. The second crimped portion 647*b* is disposed along the inner surface 647*f* of the second protrusion shape portion 6470. The second crimped portion 647*b* can be formed, for example, by applying pressure to the tip end surface 647*h* using a jig or the like and plastically deforming the tip end surface 647*h*.

Figure 17:
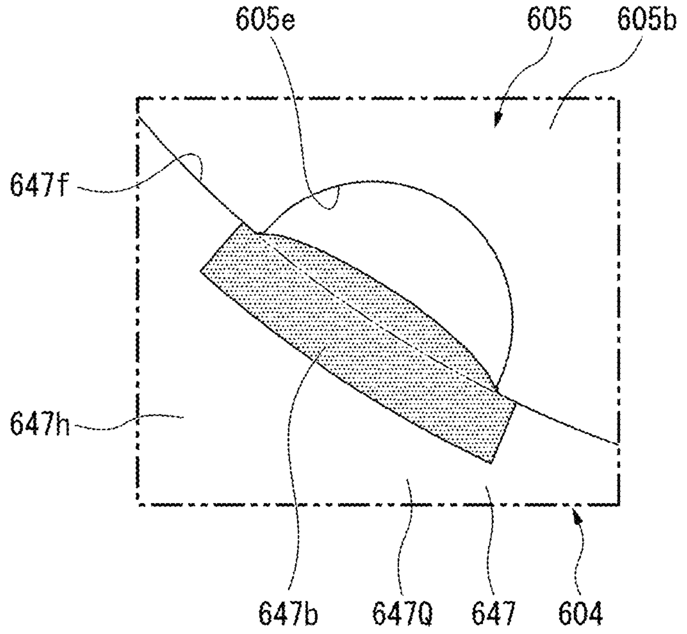
FIG. 17 is a schematic partially enlarged view of the fan and the fixing member of modification 6.

FIG. 17 is an enlarged schematic view of the fan 604 in the second crimped portion 647*b*.

By plastic deformation in the forming stage, the second crimped portion 647*b* is recessed on the axial other side (−Y side) and protrudes radially inward. The second crimped portion 647*b* is disposed inside the recess shape portion 605*e* in a part protruding radially inward. According to the present modification, a part of the second crimped portion 647*b* circumferentially faces the inner surface facing the circumferential direction of the recess shape portion 605*e*. This restricts the circumferential movement of the fan 604 with respect to the fixing member 605, and can suppress rattling of the fan 604 in the circumferential direction.

While various embodiment and variations of the present invention are described above, configurations, combinations of the configurations, and the like in each embodiment and variation are only illustrative, and addition, elimination, and substitution of a configuration(s), and other modifications can be made without departing from the spirit of the present invention. The present invention is not limited by the embodiment.

For example, in the above-described embodiment and the modifications thereof, a case where the fan is fixed to the shaft by sandwiching the fan between the fixing member and the rotor core has been described. However, the fixing method of the fan is not limited to this. In the above embodiment, a case where the fixing member is press-fitted into the outer surface of the shaft has been described. However, the fixing method of the fixing member is not limited to this.

Note that the present technique can have the following configurations.

(1) A rotor rotatable about a center axis, the rotor including: a rotor core provided with a first vent hole and a second vent hole penetrating in an axial direction; and a fan disposed to face at least one end surface on an axial one side or an axial other side of the rotor core, and provided with an outflow path connected to the first vent hole and an inflow path connected to the second vent hole, in which the fan includes a first surface facing the end surface, an outer surface positioned radially outside the first surface, and a first recess portion provided on the first surface and axially overlapping the first vent hole, the first recess portion includes a first opening portion opening to the outer surface, at least a part of the outflow path is provided in a space surrounded by the end surface and the first recess portion, and a flow path cross-sectional area of the outflow path in the first opening portion is smaller than a minimum flow path cross-sectional area of the inflow path.

(2) The rotor according to (1), in which a circumferential dimension of the first opening portion is smaller than a circumferential dimension of the inflow path in a part having the minimum flow path cross-sectional area.

(3) The rotor according to (1) or (2), in which the outflow path includes a first narrow portion in which a flow path cross-sectional area decreases toward a radial outside.

(4) The rotor according to any one of (1) to (3), in which the fan includes a first through hole penetrating axially, and the first through hole is connected to the first recess portion and constitutes at least a part of the outflow path.

(5) The rotor according to any one of (1) to (4), in which the rotor core is provided with a plurality of magnet holes penetrating axially, each of the magnet holes having a magnet disposed therein, and the first recess portion is provided at a position different from the magnet holes as viewed from an axial direction.

(6) The rotor according to (5), in which the first recess portion extends radially outward from the first vent hole side toward the outer surface, and axially overlaps a q axis of the rotor.

(7) The rotor according to any one of (1) to (6), in which the first recess portion includes a plurality of the first opening portions.

(8) The rotor according to any one of (1) to (7), in which the fan is provided with a first communication hole penetrating axially, the rotor core is provided with a pair of magnet holes penetrating axially, each of the magnet holes having a magnet disposed therein, the magnet holes being circumferentially adjacent to each other, and a second communication hole penetrating axially and communicating with the first communication hole, the pair of magnet holes are circumferentially disposed apart from each other, and extend in directions circumferentially away from each other from a radial inside toward a radial outside as viewed from an axial direction, and the second communication hole is positioned circumferentially between the pair of the magnet holes.

(9) The rotor according to (8), in which the first communication hole and the second communication hole are connected to each other via the first recess portion.

(10) The rotor according to any one of (1) to (9), further including: a shaft extending axially about the center axis; and a fixing member disposed on an axial one side of the fan to axially face the fan, in which the fixing member includes a first shaft insertion hole into which the shaft is inserted, an outer surface of the fixing member is provided with a first protrusion portion protruding radially outward, the fan includes a second shaft insertion hole into which the shaft is inserted, the second shaft insertion hole penetrating axially, a through hole penetrating axially and constituting at least a part of either the inflow path or the outflow path, a second surface positioned on an opposite side of the first surface, and a recess groove in which the first protrusion portion is disposed, the recess groove being recessed from the second surface to an axial other side and extending radially, and a radially outer end portion of the recess groove is connected to the through hole.

(11) The rotor according to any one of (1) to (9), further including: a shaft extending axially about the center axis; and a fixing member disposed on an axial one side of the fan to axially face the fan, in which the fixing member includes a first shaft insertion hole into which the shaft is inserted, an outer surface of the fixing member is provided with a first protrusion portion protruding radially outward, the fan includes a second shaft insertion hole into which the shaft is inserted, the second shaft insertion hole penetrating axially, a plurality of through holes penetrating axially, circumferentially arranged side by side, and constituting at least a part of either the inflow path or the outflow path, a second surface positioned on an opposite side of the first surface, and a recess groove recessed from the second surface to an axial other side, the recess groove is positioned between the plurality of through holes, and the first protrusion portion is disposed in the recess groove.

(12) The rotor according to (11), in which an end portion on an axial one side of the recess groove is provided with a crimped portion, and a part of the crimped portion protrudes into the recess groove and axially faces the first protrusion portion.

(13) The rotor according to any one of (1) to (12), further including: a shaft extending axially about a center axis, in which an outer peripheral surface of the shaft is provided with a key groove recessed radially inward and extending axially, the fan includes a second shaft insertion hole into which the shaft is inserted, the second shaft insertion hole penetrating axially, a plurality of through holes penetrating axially and constituting at least a part of either the inflow path or the outflow path, and a second protrusion portion protruding radially inward from an inner surface of the second shaft insertion hole and disposed in the key groove, the plurality of through holes are circumferentially arranged side by side, and a virtual line connecting a circumferential center of the second protrusion portion and the center axis is positioned between the through holes circumferentially adjacent to each other as viewed in an axial direction.

(14) The rotor according to any one of (1) to (13), in which the fan includes a second through hole penetrating axially, and a second recess portion provided in the first surface, recessed toward an axial one side, and connected to the second through hole, the second recess portion includes a second opening portion opening to the outer surface, and the inflow path includes a space, which is surrounded by the end surface and the second recess portion, and the second through hole.

(15) The rotor according to (14), in which the inflow path includes a second narrow portion in which a flow path cross-sectional area decreases toward radial outside.

(16) The rotor according to any one of (1) to (15), in which the fan is provided with a plurality of the inflow paths, the fan includes a third recess portion provided on the first surface and recessed toward an axial one side, and the third recess portion connects the plurality of inflow paths to each other.

(17) The rotor according to any one of (1) to (16), in which the fan is provided with a plurality of the outflow paths, the fan includes a fourth recess portion provided on the first surface and recessed toward an axial one side, and the fourth recess portion connects the plurality of outflow paths to each other.

(18) The rotor according to (17), in which the fourth recess portion connects a plurality of the first recess portions to each other.

(19) The rotor according to any one of (1) to (18), in which the fan includes a fifth recess portion provided on the first surface and recessed toward an axial one side, and the fifth recess portion connects the inflow path and the outflow path.

(20) A rotating electrical machine including: the rotor according to any one of (1) to (19); and a stator positioned radially outside the rotor.

(21) A drive device including: the rotating electrical machine according to (20); and a power transmission unit that transmits power of the rotating electrical machine.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor rotatable about a center axis, the rotor comprising:

a rotor core provided with a first vent hole and a second vent hole penetrating in an axial direction; and a fan disposed to face at least one end surface on an axial one side or an axial other side of the rotor core, and provided with an outflow path connected to the first vent hole and an inflow path connected to the second vent hole, wherein the fan includes a first surface facing the end surface, an outer surface positioned radially outside the first surface, and a first recess portion provided on the first surface and axially overlapping the first vent hole, the first recess portion includes a first opening portion opening to the outer surface, at least a part of the outflow path is provided in a space surrounded by the end surface and the first recess portion, and a flow path cross-sectional area of the outflow path in the first opening portion is smaller than a minimum flow path cross-sectional area of the inflow path, wherein the fan is provided with a first communication hole penetrating axially, the rotor core is provided with a pair of magnet holes penetrating axially, each of the magnet holes having a magnet disposed therein, the magnet holes being circumferentially adjacent to each other, and a second communication hole penetrating axially and communicating with the first communication hole, the pair of magnet holes are circumferentially disposed apart from each other, and extend in directions circumferentially away from each other from a radial inside toward a radial outside as viewed from an axial direction, and the second communication hole is positioned circumferentially between the pair of the magnet holes.

2. The rotor according to claim 1, wherein a circumferential dimension of the first opening portion is smaller than a circumferential dimension of the inflow path in a part having the minimum flow path cross-sectional area.

3. The rotor according to claim 1, wherein the outflow path includes a first narrow portion in which a flow path cross-sectional area decreases toward a radial outside.

4. The rotor according to claim 1, wherein the fan includes a first through hole penetrating axially, and the first through hole is connected to the first recess portion and constitutes at least a part of the outflow path.

5. The rotor according to claim 1, wherein the rotor core is provided with a plurality of magnet holes penetrating axially, each of the magnet holes having a magnet disposed therein, and the first recess portion is provided at a position different from the magnet holes as viewed from an axial direction.

6. The rotor according to claim 5, wherein the first recess portion extends radially outward from the first vent hole side toward the outer surface, and axially overlaps a q axis of the rotor.

7. The rotor according to claim 1, wherein the first recess portion includes a plurality of the first opening portions.

8. The rotor according to claim 1, wherein the first communication hole and the second communication hole are connected to each other via the first recess portion.

9. The rotor according to claim 1, further comprising:

a shaft extending axially about the center axis; and a fixing member disposed on an axial one side of the fan to axially face the fan, wherein the fixing member includes a first shaft insertion hole into which the shaft is inserted, an outer surface of the fixing member is provided with a first protrusion portion protruding radially outward, the fan includes a second shaft insertion hole into which the shaft is inserted, the second shaft insertion hole penetrating axially, a through hole penetrating axially and constituting at least a part of either the inflow path or the outflow path, a second surface positioned on an opposite side of the first surface, and a recess groove in which the first protrusion portion is disposed, the recess groove being recessed from the second surface to an axial other side and extending radially, and a radially outer end portion of the recess groove is connected to the through hole.

10. A rotor rotatable about a center axis, the rotor comprising:

a rotor core provided with a first vent hole and a second vent hole penetrating in an axial direction; and a fan disposed to face at least one end surface on an axial one side or an axial other side of the rotor core, and provided with an outflow path connected to the first vent hole and an inflow path connected to the second vent hole, wherein the fan includes a first surface facing the end surface, an outer surface positioned radially outside the first surface, and a first recess portion provided on the first surface and axially overlapping the first vent hole, the first recess portion includes a first opening portion opening to the outer surface, at least a part of the outflow path is provided in a space surrounded by the end surface and the first recess portion, and a flow path cross-sectional area of the outflow path in the first opening portion is smaller than a minimum flow path cross-sectional area of the inflow path;

a shaft extending axially about the center axis; and a fixing member disposed on an axial one side of the fan to axially face the fan, wherein the fixing member includes a first shaft insertion hole into which the shaft is inserted, an outer surface of the fixing member is provided with a first protrusion portion protruding radially outward, the fan includes a second shaft insertion hole into which the shaft is inserted, the second shaft insertion hole penetrating axially, a plurality of through holes penetrating axially, circumferentially arranged side by side, and constituting at least a part of either the inflow path or the outflow path, a second surface positioned on an opposite side of the first surface, and a recess groove recessed from the second surface to an axial other side, the recess groove is positioned between the plurality of through holes, and the first protrusion portion is disposed in the recess groove.

11. The rotor according to claim 10, wherein an end portion on an axial one side of the recess groove is provided with a crimped portion, and a part of the crimped portion protrudes into the recess groove and axially faces the first protrusion portion.

12. A rotor rotatable about a center axis, the rotor comprising:

a rotor core provided with a first vent hole and a second vent hole penetrating in an axial direction; and a fan disposed to face at least one end surface on an axial one side or an axial other side of the rotor core, and provided with an outflow path connected to the first vent hole and an inflow path connected to the second vent hole, wherein the fan includes a first surface facing the end surface, an outer surface positioned radially outside the first surface, and a first recess portion provided on the first surface and axially overlapping the first vent hole, the first recess portion includes a first opening portion opening to the outer surface, at least a part of the outflow path is provided in a space surrounded by the end surface and the first recess portion, and a flow path cross-sectional area of the outflow path in the first opening portion is smaller than a minimum flow path cross-sectional area of the inflow path;

a shaft extending axially about a center axis, wherein an outer peripheral surface of the shaft is provided with a key groove recessed radially inward and extending axially, the fan includes a second shaft insertion hole into which the shaft is inserted, the second shaft insertion hole penetrating axially, a plurality of through holes penetrating axially and constituting at least a part of either the inflow path or the outflow path, and a second protrusion portion protruding radially inward from an inner surface of the second shaft insertion hole and disposed in the key groove, the plurality of through holes are circumferentially arranged side by side, and a virtual line connecting a circumferential center of the second protrusion portion and the center axis is positioned between the through holes circumferentially adjacent to each other as viewed in an axial direction.

13. The rotor according to claim 1, wherein the fan includes a second through hole penetrating axially, and a second recess portion provided in the first surface, recessed toward an axial one side, and connected to the second through hole, the second recess portion includes a second opening portion opening to the outer surface, and the inflow path includes a space, which is surrounded by the end surface and the second recess portion, and the second through hole.

14. The rotor according to claim 13, wherein the inflow path includes a second narrow portion in which a flow path cross-sectional area decreases toward radial outside.

15. The rotor according to claim 1, wherein the fan is provided with a plurality of the inflow paths, the fan includes a third recess portion provided on the first surface and recessed toward an axial one side, and the third recess portion connects the plurality of inflow paths to each other.

16. The rotor according to claim 1, wherein the fan is provided with a plurality of the outflow paths, the fan includes a fourth recess portion provided on the first surface and recessed toward an axial one side, and the fourth recess portion connects the plurality of outflow paths to each other.

17. The rotor according to claim 16, wherein the fourth recess portion connects a plurality of the first recess portions to each other.

18. The rotor according to claim 1, wherein the fan includes a fifth recess portion provided on the first surface and recessed toward an axial one side, and the fifth recess portion connects the inflow path and the outflow path.

19. A rotating electrical machine comprising:

the rotor according to claim 1; and a stator positioned radially outside the rotor.

20. A drive device comprising:

the rotating electrical machine according to claim 19; and a power transmission unit that transmits power of the rotating electrical machine.

* * * * *